US012771831B2

(12) United States Patent
Lim

(10) Patent No.: US 12,771,831 B2
(45) Date of Patent: Oct. 20, 2026

(54) IMAGE ENCODING/DECODING METHOD AND APPARATUS INVOLVING HISTOGRAM INTRA PREDICTION MODE DERIVATION

(71) Applicant: KT CORPORATION, Gyeonggi-do (KR)

(72) Inventor: Sung Won Lim, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 18/847,005

(22) PCT Filed: Mar. 15, 2023

(86) PCT No.: PCT/KR2023/003438
§ 371 (c)(1),
(2) Date: Sep. 13, 2024

(87) PCT Pub. No.: WO2023/177197
PCT Pub. Date: Sep. 21, 2023

(65) Prior Publication Data
US 2025/0220165 A1 Jul. 3, 2025

(30) Foreign Application Priority Data

Mar. 15, 2022 (KR) ........................ 10-2022-0032239
Mar. 14, 2023 (KR) ........................ 10-2023-0033045

(51) Int. Cl.
*H04N 19/11* (2014.01)
*H04N 19/105* (2014.01)
(Continued)

(52) U.S. Cl.
CPC ........... *H04N 19/11* (2014.11); *H04N 19/105* (2014.11); *H04N 19/14* (2014.11); *H04N 19/176* (2014.11)

(58) Field of Classification Search
CPC ...... H04N 19/11; H04N 19/105; H04N 19/14; H04N 19/176; H04N 19/593
See application file for complete search history.

(56) References Cited

U.S. PATENT DOCUMENTS

2015/0016537 A1* 1/2015 Karczewicz ......... H04N 19/176 375/240.18
2017/0302962 A1* 10/2017 Shen ...................... H04N 19/14
(Continued)

FOREIGN PATENT DOCUMENTS

JP 2019-213096 A 12/2019
KR 10-2018-0135075 A 12/2018
(Continued)

OTHER PUBLICATIONS

Korean Intellectual Property Office, International Search Report of International Application No. PCT/KR2023/003438, Jul. 3, 2023.
(Continued)

*Primary Examiner* — Francis Geroleo
(74) *Attorney, Agent, or Firm* — IP Legal Services, LLC

(57) ABSTRACT

Provided is an image encoding/decoding method. The method may include determining at least one intra prediction mode for a current block; and on the basis of the at least one intra prediction mode, performing intra prediction on the current block. Here, the at least one intra prediction mode may be determined via a histogram derived from a reference region of the current block.

7 Claims, 15 Drawing Sheets

(51) Int. Cl.
*H04N 19/14* (2014.01)
*H04N 19/176* (2014.01)

(56) References Cited

U.S. PATENT DOCUMENTS

| | | | | |
|---|---|---|---|---|
| 2021/0112242 | A1 | 4/2021 | Kidani et al. | |
| 2021/0243452 | A1 | 8/2021 | Zhao et al. | |
| 2021/0281831 | A1 | 9/2021 | Alshin et al. | |
| 2022/0030252 | A1 | 1/2022 | Zhao et al. | |
| 2022/0201281 | A1* | 6/2022 | Li | H04N 19/176 |
| 2023/0171412 | A1 | 6/2023 | Zhao et al. | |
| 2023/0217030 | A1* | 7/2023 | Li | H04N 19/159<br>375/240.12 |
| 2024/0380885 | A1* | 11/2024 | Dumas | H04N 19/11 |

FOREIGN PATENT DOCUMENTS

| | | | |
|---|---|---|---|
| KR | 10-2021-0134407 | A | 11/2021 |
| WO | 2018/012808 | A1 | 1/2018 |
| WO | 2018/099579 | A1 | 6/2018 |
| WO | 2021/158615 | A1 | 8/2021 |

OTHER PUBLICATIONS

Korean Intellectual Property Office, Written Opinion of International Application No. PCT/KR2023/003438, Jul. 3, 2023.

Mohsen Abdoli et al., "Non-CE3: Decoder-side Intra Mode Derivation with Prediction Fusion Using Planar", Document: JVET-O0449-v2, Joint Video Experts Team (JVET) of ITU-T SG 16 WP 3 and ISO/IEC JTC 1/SC 29/WG 11, 15th Meeting: Gothenburg, SE, Jul. 3-12, 2019.

Elie Mora et al., "CE3-related: Decoder-side Intra Mode Derivation", Document: JVET-L0164-v2, Joint Video Experts Team (JVET) of ITU-T SG 16 WP 3 and ISO/IEC JTC 1/SC 29/WG 11, 12th Meeting: Macao, CN, Oct. 3-12, 2018, pp. 1-8.

Elie Mora, "CE3-related: Decoder-side Intra Mode Derivation", JVET-L0164, Oct. 2018, pp. 1-29.

Tao Zhang et al., "Fast Intra-Mode and CU Size Decision for HEVC", IEEE Transactions on Circuits and Systems for Video Technology, Aug. 2017, pp. 1714-1726, vol. 27, No. 8.

European Patent Office, Extended European Search Report of corresponding EP Patent Application No. 23771076.9, Feb. 3, 2026.

* cited by examiner

FIG. 10

| | | | | | | | | | | | | | | | | | | | | | | | |
|---|---|---|---|---|---|---|---|---|---|---|---|---|---|---|---|---|---|---|---|---|---|---|---|
| Intra prediction mode | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| tanθ × 32 | X | X | 32 | 29 | 26 | 23 | 20 | 18 | 16 | 14 | 12 | 10 | 8 | 6 | 4 | 3 | 2 | 1 | 0 | -1 | -2 | -3 | -4 |
| Intra prediction mode | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 |
| tanθ × 32 | -6 | -8 | -10 | -12 | -14 | -16 | -18 | -20 | -23 | -26 | -29 | -32 | -29 | -26 | -23 | -20 | -18 | -16 | -14 | -12 | -10 | -8 | -6 |
| Intra prediction mode | 46 | 47 | 48 | 49 | 50 | 51 | 52 | 53 | 54 | 55 | 56 | 57 | 58 | 59 | 60 | 61 | 62 | 63 | 64 | 65 | 66 | | |
| tanθ × 32 | -4 | -3 | -2 | -1 | 0 | 1 | 2 | 3 | 4 | 6 | 8 | 10 | 12 | 14 | 16 | 18 | 20 | 23 | 26 | 29 | 32 | | |

FIG. 11

| Intra prediction mode | -14 | -13 | -12 | -11 | -10 | -9 | -8 | -7 | -6 | -5 | -4 | -3 | -2 | -1 |
|---|---|---|---|---|---|---|---|---|---|---|---|---|---|---|
| tanθ × 32 | 512 | 341 | 256 | 171 | 128 | 102 | 86 | 73 | 64 | 57 | 51 | 45 | 39 | 35 |
| Intra prediction mode | 67 | 68 | 69 | 70 | 71 | 72 | 73 | 74 | 75 | 76 | 77 | 78 | 79 | 80 |
| tanθ × 32 | 35 | 39 | 45 | 51 | 57 | 64 | 73 | 86 | 102 | 128 | 171 | 256 | 341 | 512 |

Sobel Mask

Vertical mask

| | | |
|---|---|---|
| -1 | 0 | 1 |
| -2 | 0 | 2 |
| -1 | 0 | 1 |

Horizontal mask

| | | |
|---|---|---|
| 1 | 2 | 1 |
| 0 | 0 | 0 |
| -1 | -2 | -1 |

Prewitt Mask

Vertical mask

| | | |
|---|---|---|
| -1 | 0 | 1 |
| -1 | 0 | 1 |
| -1 | 0 | 1 |

Horizontal mask

| | | |
|---|---|---|
| 1 | 1 | 1 |
| 0 | 0 | 0 |
| -1 | -1 | -1 |

Luma Sample

IMAGE ENCODING/DECODING METHOD AND APPARATUS INVOLVING HISTOGRAM INTRA PREDICTION MODE DERIVATION

CROSS REFERENCE TO RELATED APPLICATIONS

This application is a National Stage Patent Application of PCT International Patent Application No. PCT/KR2023/003438 (filed on Mar. 15, 2023) under 35 U.S.C. § 371, which claims priority to Korean Patent Application Nos. 10-2022-0032239 (filed on Mar. 15, 2022) and 10-2023-0033045 (filed on Mar. 14, 2023), the teachings of which are incorporated herein in their entireties by reference.

TECHNICAL FIELD

The present disclosure relates to a method and a device for processing an image signal.

BACKGROUND ART

Recently, demands for high-resolution and high-quality images such as HD (High Definition) images and UHD (Ultra High Definition) images have increased in a variety of application fields. As image data becomes high-resolution and high-quality, the volume of data relatively increases compared to the existing image data, so when image data is transmitted by using media such as the existing wire and wireless broadband circuit or is stored by using the existing storage medium, expenses for transmission and expenses for storage increase. High efficiency image compression technologies may be utilized to resolve these problems which are generated as image data becomes high-resolution and high-quality.

There are various technologies such as an inter prediction technology which predicts a pixel value included in a current picture from a previous or subsequent picture of a current picture with an image impression technology, an intra prediction technology which predicts a pixel value included in a current picture by using pixel information in a current picture, an entropy encoding technology which assigns a short sign to a value with high appearance frequency and assigns a long sign to a value with low appearance frequency and so on, and image data may be effectively compressed and transmitted or stored by using these image compression technologies.

On the other hand, as demands for a high-resolution image have increased, demands for stereo-scopic image contents have increased as a new image service. A video compression technology for effectively providing high-resolution and ultra high-resolution stereo-scopic image contents has been discussed.

DISCLOSURE

Technical Problem

The purpose of the present disclosure is to provide an intra prediction method and device in encoding/decoding an image signal.

The purpose of the present disclosure is to provide a method and a device for determining an intra prediction mode for intra prediction on a decoder side in encoding/decoding an image signal.

The purpose of the present disclosure is to provide a method and a device for obtaining a prediction block by using a plurality of intra prediction modes in encoding/decoding an image signal.

Technical effects of the present disclosure may be non-limited by the above-mentioned technical effects, and other unmentioned technical effects may be clearly understood from the following description by those having ordinary skill in the technical field to which the present disclosure pertains.

Technical Solution

An image decoding method according to the present disclosure may include determining at least one intra prediction mode for a current block; and based on the at least one intra prediction mode, performing intra prediction on the current block.

In this case, the at least one intra prediction mode may be determined via a histogram derived from a reference region of the current block.

An image encoding method according to the present disclosure may include determining at least one intra prediction mode for a current block; and based on the at least one intra prediction mode, performing intra prediction on the current block.

In this case, the at least one intra prediction mode may be determined via a histogram derived from a reference region of the current block.

In an image decoding/encoding method according to the present disclosure, the reference region includes a top reference region at a top position of the current block and a left reference region at a left position of the current block, and the histogram may be generated based on an intra prediction mode and an amplitude of each reference sample belonging to the reference region.

In an image decoding/encoding method according to the present disclosure, an intra prediction mode of a reference sample may be obtained based on a ratio between an absolute value of a horizontal gradient and an absolute value of a vertical gradient of the reference sample.

In an image decoding/encoding method according to the present disclosure, an amplitude of the reference sample may be derived as a sum of an absolute value of the horizontal gradient and an absolute value of the vertical gradient of the reference sample.

In an image decoding/encoding method according to the present disclosure, the horizontal gradient and the vertical gradient of the reference sample are obtained by applying a filter to the reference sample, and the filter may be a Sobel mask or a Prewitt mask.

In an image decoding/encoding method according to the present disclosure, the histogram may be obtained by accumulating an amplitude of a reference sample for each intra prediction mode.

In an image decoding/encoding method according to the present disclosure, the at least one intra prediction mode may be determined in descending order of accumulated amplitude values in the histogram.

In an image decoding/encoding method according to the present disclosure, when a plurality of intra prediction modes are selected from the histogram, intra prediction may be performed based on each of the plurality of intra prediction modes to obtain a plurality of prediction blocks, and through an average operation or a weighted sum operation of the plurality of prediction blocks, a final prediction block of the current block may be obtained.

In an image decoding/encoding method according to the present disclosure, intra prediction may be performed based on each of the at least one intra prediction mode and a default mode to obtain a plurality of prediction blocks, and through an average operation or a weighted sum operation of the plurality of prediction blocks, a final prediction block of the current block may be obtained.

In an image decoding/encoding method according to the present disclosure, the default mode may include at least one of a planar mode, a DC mode, a vertical mode or a horizontal mode.

A computer-readable recording medium that stores a bitstream encoded by an image encoding method according to the present disclosure may be provided.

Technical Effects

According to the present disclosure, encoding efficiency of an intra prediction mode of a current block may be improved by deriving an intra prediction mode from a decoder side.

According to the present disclosure, accuracy of intra prediction may be improved by using a plurality of intra prediction modes.

Effects obtainable from the present disclosure are not limited to the above-mentioned effects and other unmentioned effects may be clearly understood from the following description by those having ordinary skill in the technical field to which the present disclosure pertains.

BRIEF DESCRIPTION OF DRAWINGS

FIGS. 10 and 11 show that a tangent value for an angle is scaled 32 times per intra prediction mode.

MODE FOR INVENTION

Figure 1:
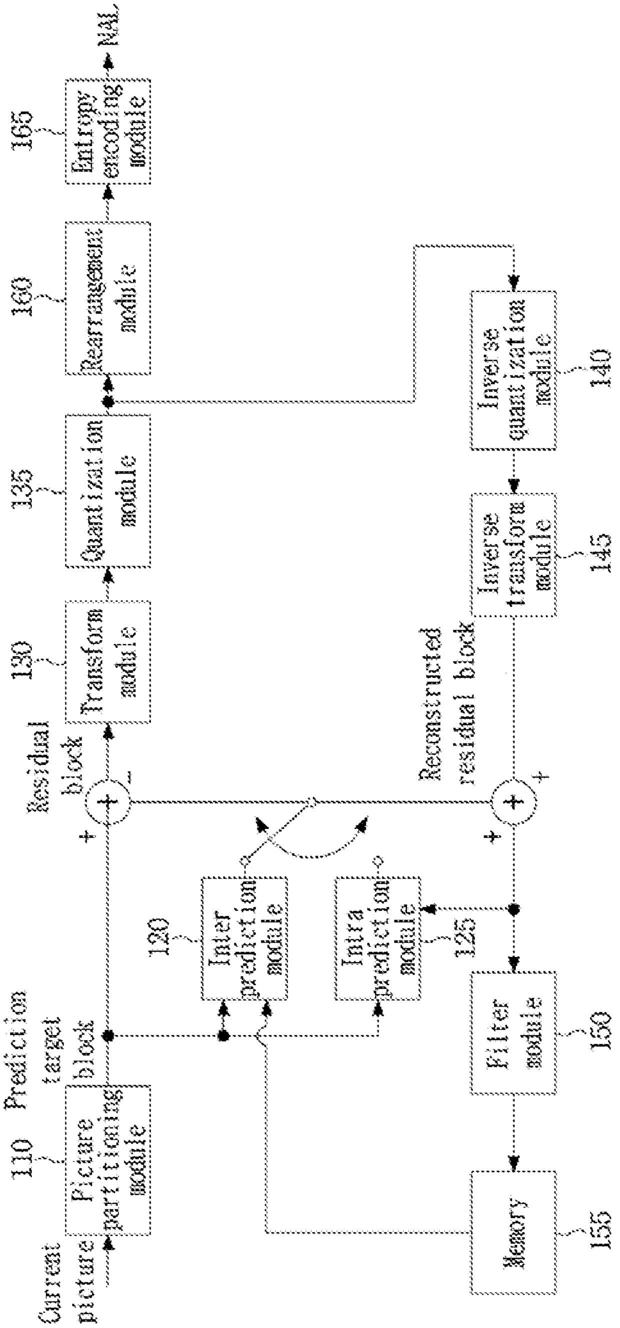
FIG. 1 is a block diagram showing an image encoding device according to an embodiment of the present disclosure.

As the present disclosure may make various changes and have several embodiments, specific embodiments will be illustrated in a drawing and described in detail. But, it is not intended to limit the present disclosure to a specific embodiment, and it should be understood that it includes all changes, equivalents or substitutes included in an idea and a technical scope for the present disclosure. A similar reference numeral was used for a similar component while describing each drawing.

A term such as first, second, etc. may be used to describe various components, but the components should not be limited by the terms. The terms are used only to distinguish one component from other components. For example, without going beyond a scope of a right of the present disclosure, a first component may be referred to as a second component and similarly, a second component may be also referred to as a first component. A term of and/or includes a combination of a plurality of relative entered items or any item of a plurality of relative entered items.

When a component is referred to as being "linked" or "connected" to other component, it should be understood that it may be directly linked or connected to that other component, but other component may exist in the middle. On the other hand, when a component is referred to as being "directly linked" or "directly connected" to other component, it should be understood that other component does not exist in the middle.

As terms used in this application are just used to describe a specific embodiment, they are not intended to limit the present disclosure. Expression of the singular includes expression of the plural unless it clearly has a different meaning contextually. In this application, it should be understood that a term such as "include" or "have", etc. is to designate the existence of characteristics, numbers, steps, motions, components, parts or their combinations entered in the specification, but is not to exclude a possibility of addition or existence of one or more other characteristics, numbers, steps, motions, components, parts or their combinations in advance.

Hereinafter, referring to the attached drawings, a desirable embodiment of the present disclosure will be described in more detail. Hereinafter, the same reference numeral is used for the same component in a drawing and an overlapping description for the same component is omitted.

FIG. 1 is a block diagram showing an image encoding device according to an embodiment of the present disclosure.

Referring to FIG. 1, an image encoding device 100 may include a picture partitioning unit 110, prediction units 120 and 125, a transform unit 130, a quantization unit 135, a rearrangement unit 160, an entropy encoding unit 165, a dequantization unit 140, an inverse-transform unit 145, a filter unit 150, and a memory 155.

As each construction unit shown in FIG. 1 is independently shown to represent different characteristic functions in an image encoding device, it does not mean that each construction unit is constituted by separated hardware or one software unit. That is, as each construction unit is included by being enumerated as each construction unit for convenience of a description, at least two construction units of each construction unit may be combined to constitute one construction unit or one construction unit may be partitioned into a plurality of construction units to perform a function, and even an integrated embodiment and a separated embodiment of each construction unit are also included in a scope of a right of the present disclosure unless they are departing from the essence of the present disclosure.

Further, some components may be just an optional component for improving performance, not a necessary component which perform an essential function in the present disclosure. The present disclosure may be implemented by including only a construction unit necessary for implementing the essence of the present disclosure excluding a component used to just improve performance, and a structure including only a necessary component excluding an optional component used to just improve performance is also included in a scope of a right of the present disclosure.

A picture partitioning unit 110 may partition an input picture into at least one processing unit. In this case, a processing unit may be a prediction unit (PU), a transform unit (TU) or a coding unit (CU). In a picture partitioning unit 110, one picture may be partitioned into a combination of a plurality of coding units, prediction units and transform units and a picture may be encoded by selecting a combination of one coding unit, prediction unit and transform unit according to a predetermined standard (e.g., a cost function).

For example, one picture may be partitioned into a plurality of coding units. In order to partition a coding unit in a picture, a recursive tree structure such as a quad tree may be used, and a coding unit which is partitioned into other coding units by using one image or the largest coding unit as a route may be partitioned with as many child nodes as the number of partitioned coding units. A coding unit which is no longer partitioned according to a certain restriction becomes a leaf node. In other words, when it is assumed that only square partitioning is possible for one coding unit, one coding unit may be partitioned into up to four other coding units.

Hereinafter, in an embodiment of the present disclosure, a coding unit may be used as a unit for encoding or may be used as a unit for decoding.

A prediction unit may be partitioned with at least one square or rectangular shape, etc. in the same size in one coding unit or may be partitioned so that any one prediction unit of prediction units partitioned in one coding unit can have a shape and/or a size different from another prediction unit.

When a prediction unit for which intra prediction is performed based on a coding unit is generated and it is not the minimum coding unit, intra prediction may be performed without being partitioned into a plurality of prediction units N×N.

Prediction units 120 and 125 may include an inter prediction unit 120 performing inter prediction and an intra prediction unit 125 performing intra prediction. Whether to perform inter prediction or intra prediction for a coding unit may be determined and detailed information according to each prediction method (e.g., an intra prediction mode, a motion vector, a reference picture, etc.) may be determined. In this case, a processing unit that prediction is performed may be different from a processing unit that a prediction method and details are determined. For example, a prediction method, a prediction mode, etc. may be determined in a prediction unit and prediction may be performed in a transform unit. A residual value (a residual block) between a generated prediction block and an original block may be input to a transform unit 130. In addition, prediction mode information, motion vector information, etc. used for prediction may be encoded with a residual value in an entropy encoding unit 165 and may be transmitted to a decoding device. When a specific encoding mode is used, an original block may be encoded as it is and transmitted to a decoding unit without generating a prediction block through prediction units 120 or 125.

An inter prediction unit 120 may predict a prediction unit based on information on at least one picture of a previous picture or a subsequent picture of a current picture, or in some cases, may predict a prediction unit based on information on some encoded regions in a current picture. An inter prediction unit 120 may include a reference picture interpolation unit, a motion prediction unit and a motion compensation unit.

A reference picture interpolation unit may receive reference picture information from a memory 155 and generate pixel information equal to or less than an integer pixel in a reference picture. For a luma pixel, a 8-tap DCT-based interpolation filter having a different filter coefficient may be used to generate pixel information equal to or less than an integer pixel in a ¼ pixel unit. For a chroma signal, a 4-tap DCT-based interpolation filter having a different filter coefficient may be used to generate pixel information equal to or less than an integer pixel in a ⅛ pixel unit.

A motion prediction unit may perform motion prediction based on a reference picture interpolated by a reference picture interpolation unit. As a method for calculating a motion vector, various methods such as FBMA (Full search-based Block Matching Algorithm), TSS (Three Step Search), NTS (New Three-Step Search Algorithm), etc. may be used. A motion vector may have a motion vector value in a ½ or ¼ pixel unit based on an interpolated pixel. A motion prediction unit may predict a current prediction unit by varying a motion prediction method. As a motion prediction method, various methods such as a skip method, a merge method, an advanced motion vector prediction (AMVP) method, an intra block copy method, etc. may be used.

An intra prediction unit 125 may generate a prediction unit based on reference pixel information around a current block which is pixel information in a current picture. When a neighboring block in a current prediction unit is a block which performed inter prediction and accordingly, a reference pixel is a pixel which performed inter prediction, a reference pixel included in a block which performed inter prediction may be used by being replaced with reference pixel information of a surrounding block which performed intra prediction. In other words, when a reference pixel is unavailable, unavailable reference pixel information may be used by being replaced with at least one reference pixel of available reference pixels.

A prediction mode in intra prediction may have a directional prediction mode using reference pixel information according to a prediction direction and a non-directional mode not using directional information when performing prediction. A mode for predicting luma information may be different from a mode for predicting chroma information and intra prediction mode information used for predicting luma information or predicted luma signal information may be utilized to predict chroma information.

When a size of a prediction unit is the same as that of a transform unit in performing intra prediction, intra prediction for a prediction unit may be performed based on a pixel at a left position of a prediction unit, a pixel at a top-left position and a pixel at a top position. However, if a size of a prediction unit is different from a size of a transform unit when intra prediction is performed, intra prediction may be performed by using a reference pixel based on a transform unit. In addition, intra prediction using N×N partition may be used only for the minimum coding unit.

An intra prediction method may generate a prediction block after applying an adaptive intra smoothing (AIS) filter to a reference pixel according to a prediction mode. A type of an AIS filter applied to a reference pixel may be different. In order to perform an intra prediction method, an intra prediction mode in a current prediction unit may be predicted from an intra prediction mode in a prediction unit around a current prediction unit. When a prediction mode in a current prediction unit is predicted by using mode information predicted from a surrounding prediction unit, information that a prediction mode in a current prediction unit is the same as a prediction mode in a surrounding prediction unit may be transmitted by using predetermined flag information if an intra prediction mode in a current prediction unit is the same as an intra prediction mode in a surrounding prediction unit, and prediction mode information of a current block may be encoded by performing entropy encoding if a prediction mode in a current prediction unit is different from a prediction mode in a surrounding prediction unit.

In addition, a residual block may be generated which includes information on a residual value that is a difference value between a prediction unit which performed prediction based on a prediction unit generated in prediction units 120 and 125 and an original block in a prediction unit. A generated residual block may be input to a transform unit 130.

A transform unit 130 may transform an original block and a residual block including residual value information in a prediction unit generated through prediction units 120 and 125 by using a transform method such as DCT (Discrete Cosine Transform), DST (Discrete Sine Transform), KLT. Whether to apply DCT, DST or KLT to transform a residual block may be determined based on intra prediction mode information in a prediction unit used to generate a residual block.

A quantization unit 135 may quantize values transformed into a frequency domain in a transform unit 130. A quantization coefficient may be changed according to a block or importance of an image. A value calculated in a quantization unit 135 may be provided to a dequantization unit 140 and a rearrangement unit 160.

A rearrangement unit 160 may perform rearrangement of a coefficient value for a quantized residual value.

A rearrangement unit 160 may change a coefficient in a shape of a two-dimensional block into a shape of a one-dimensional vector through a coefficient scan method. For example, a rearrangement unit 160 may scan a DC coefficient to a coefficient in a high-frequency domain by using a zig-zag scan method and change it into a shape of a one-dimensional vector. According to a size of a transform unit and an intra prediction mode, instead of zig-zag scan, vertical scan where a coefficient in a shape of a two-dimensional block is scanned in a column direction or horizontal scan where a coefficient in a shape of a two-dimensional block is scanned in a row direction may be used. In other words, which scan method among zig-zag scan, vertical directional scan and horizontal directional scan will be used may be determined according to a size of a transform unit and an intra prediction mode.

An entropy encoding unit 165 may perform entropy encoding based on values calculated by a rearrangement unit 160. Entropy encoding, for example, may use various encoding methods such as exponential Golomb, CAVLC (Context-Adaptive Variable Length Coding), CABAC (Context-Adaptive Binary Arithmetic Coding).

An entropy encoding unit 165 may encode a variety of information such as residual value coefficient information and block type information in a coding unit, prediction mode information, partitioning unit information, prediction unit information and transmission unit information, motion vector information, reference frame information, block interpolation information, filtering information, etc. from a rearrangement unit 160 and prediction units 120 and 125.

An entropy encoding unit 165 may perform entropy encoding for a coefficient value in a coding unit which is input from a rearrangement unit 160.

A dequantization unit 140 and an inverse transform unit 145 dequantize values quantized in a quantization unit 135 and inversely transform values transformed in a transform unit 130. A residual value generated by a dequantization unit 140 and an inverse transform unit 145 may be combined with a prediction unit predicted by a motion prediction unit, a motion compensation unit and an intra prediction unit included in prediction units 120 and 125 to generate a reconstructed block.

A filter unit 150 may include at least one of a deblocking filter, an offset correction unit and an adaptive loop filter (ALF).

A deblocking filter may remove block distortion which is generated by a boundary between blocks in a reconstructed picture. In order to determine whether deblocking is performed, whether a deblocking filter will be applied to a current block may be determined based on a pixel included in several rows or columns included in a block. When a deblocking filter is applied to a block, a strong filter or a weak filter may be applied according to required deblocking filtering strength. In addition, in applying a deblocking filter, when horizontal filtering and vertical filtering are performed, horizontal directional filtering and vertical directional filtering may be set to be processed in parallel.

An offset correction unit may correct an offset with an original image in a unit of a pixel for an image that deblocking was performed. In order to perform offset correction for a specific picture, a region where an offset will be performed may be determined after dividing a pixel included in an image into the certain number of regions and a method in which an offset is applied to a corresponding region or a method in which an offset is applied by considering edge information of each pixel may be used.

Adaptive loop filtering (ALF) may be performed based on a value obtained by comparing a filtered reconstructed image with an original image. After a pixel included in an image is divided into predetermined groups, filtering may be discriminately performed per group by determining one filter which will be applied to a corresponding group. Information related to whether to apply ALF may be transmitted per coding unit (CU) for a luma signal and a shape and a filter coefficient of an ALF filter to be applied may vary according to each block. In addition, an ALF filter in the same shape (fixed shape) may be applied regardless of a characteristic of a block to be applied.

A memory 155 may store a reconstructed block or picture calculated through a filter unit 150 and a stored reconstructed block or picture may be provided to prediction units 120 and 125 when performing inter prediction.

Figure 2:
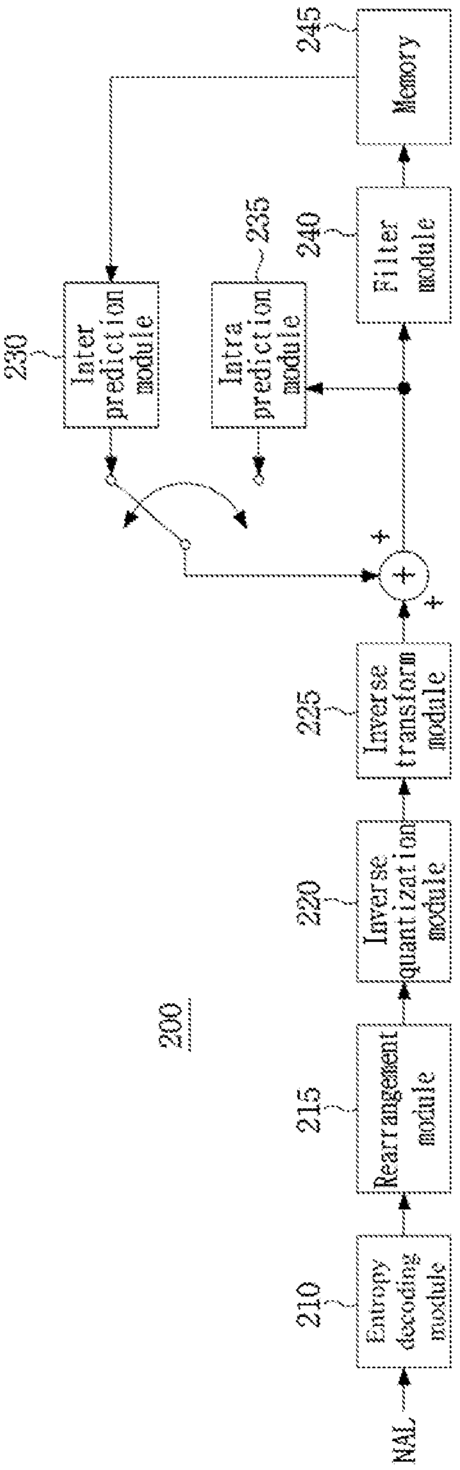
FIG. 2 is a block diagram showing an image decoding device according to an embodiment of the present disclosure.

FIG. 2 is a block diagram showing an image decoding device according to an embodiment of the present disclosure.

Referring to FIG. 2, an image decoding device 200 may include an entropy decoding unit 210, a rearrangement unit 215, a dequantization unit 220, an inverse transform unit 225, prediction units 230 and 235, a filter unit 240, and a memory 245.

When an image bitstream is input from an image encoding device, an input bitstream may be decoded according to a procedure opposite to that of an image encoding device.

An entropy decoding unit 210 may perform entropy decoding according to a procedure opposite to a procedure in which entropy encoding is performed in an entropy encoding unit of an image encoding device. For example, in response to a method performed in an image encoding device, various methods such as Exponential Golomb, CAVLC (Context-Adaptive Variable Length Coding), CABAC (Context-Adaptive Binary Arithmetic Coding) may be applied.

An entropy decoding unit 210 may decode information related to intra prediction and inter prediction performed in an encoding device.

A rearrangement unit 215 may perform rearrangement based on a method that a bitstream entropy-decoded in an entropy decoding unit 210 is rearranged in an encoding unit. Coefficients expressed in a form of a one-dimensional vector may be rearranged by being reconstructed into coefficients in a form of a two-dimensional block. A rearrangement unit 215 may receive information related to coefficient scanning performed in an encoding unit and perform rearrangement through a method in which scanning is inversely performed based on scanning order performed in a corresponding encoding unit.

A dequantization unit 220 may perform dequantization based on a quantization parameter provided from an encoding device and a coefficient value of a rearranged block.

An inverse transform unit 225 may perform transform performed in a transform unit, i.e., inverse transform for DCT, DST, and KLT, i.e., inverse DCT, inverse DST and inverse KLT for a result of quantization performed in an image encoding device. Inverse transform may be performed based on a transmission unit determined in an image encoding device. In an inverse transform unit 225 of an image decoding device, a transform technique (for example, DCT, DST, KLT) may be selectively performed according to a plurality of information such as a prediction method, a size of a current block, a prediction mode, etc.

Prediction units 230 and 235 may generate a prediction block based on information related to generation of a prediction block provided from an entropy decoding unit 210 and pre-decoded block or picture information provided from a memory 245.

As described above, when a size of a prediction unit is the same as a size of a transform unit in performing intra prediction in the same manner as an operation in an image encoding device, intra prediction for a prediction unit may be performed based on a pixel at a left position of a prediction unit, a pixel at a top-left position and a pixel at a top position, but when a size of a prediction unit is different from a size of a transform unit in performing intra prediction, intra prediction may be performed by using a reference pixel based on a transform unit. In addition, intra prediction using N×N partitioning may be used only for the smallest coding unit.

Prediction units 230 and 235 may include a prediction unit determination unit, an inter prediction unit and an intra prediction unit. A prediction unit determination unit may receive a variety of information such as prediction unit information, prediction mode information of an intra prediction method, motion prediction-related information of an inter prediction method, etc. which are input from an entropy decoding unit 210, divide a prediction unit in a current coding unit and determine whether a prediction unit performs inter prediction or intra prediction. An inter prediction unit 230 may perform inter prediction for a current prediction unit based on information included in at least one picture of a previous picture or a subsequent picture of a current picture including a current prediction unit by using information necessary for inter prediction in a current prediction unit provided from an image encoding device. Alternatively, inter prediction may be performed based on information on some regions which are pre-reconstructed in a current picture including a current prediction unit.

In order to perform inter prediction, whether a motion prediction method in a prediction unit included in a corresponding coding unit is a skip mode, a merge mode, an AMVP mode, or an intra block copy mode may be determined based on a coding unit.

An intra prediction unit 235 may generate a prediction block based on pixel information in a current picture. When a prediction unit is a prediction unit which performed intra prediction, intra prediction may be performed based on intra prediction mode information in a prediction unit provided from an image encoding device. An intra prediction unit 235 may include an adaptive intra smoothing (AIS) filter, a reference pixel interpolation unit and a DC filter. As a part performing filtering on a reference pixel of a current block, an AIS filter may be applied by determining whether a filter is applied according to a prediction mode in a current prediction unit. AIS filtering may be performed for a reference pixel of a current block by using AIS filter information and a prediction mode in a prediction unit provided from an image encoding device. When a prediction mode of a current block is a mode which does not perform AIS filtering, an AIS filter may not be applied.

When a prediction mode in a prediction unit is a prediction unit which performs intra prediction based on a pixel value which interpolated a reference pixel, a reference pixel interpolation unit may interpolate a reference pixel to generate a reference pixel in a unit of a pixel equal to or less than an integer value. When a prediction mode in a current prediction unit is a prediction mode which generates a prediction block without interpolating a reference pixel, a reference pixel may not be interpolated. A DC filter may generate a prediction block through filtering when a prediction mode of a current block is a DC mode.

A reconstructed block or picture may be provided to a filter unit 240. A filter unit 240 may include a deblocking filter, an offset correction unit and an ALF.

Information on whether a deblocking filter was applied to a corresponding block or picture and information on whether a strong filter or a weak filter was applied when a deblocking filter was applied may be provided from an image encoding device. Information related to a deblocking filter provided from an image encoding device may be provided in a deblocking filter of an image decoding device and deblocking filtering for a corresponding block may be performed in an image decoding device.

An offset correction unit may perform offset correction on a reconstructed image based on offset value information, a type of offset correction, etc. applied to an image when performing encoding.

An ALF may be applied to a coding unit based on information on whether ALF is applied, ALF coefficient information, etc. provided from an encoding device. Such ALF information may be provided by being included in a specific parameter set.

A memory 245 may store a reconstructed picture or block for use as a reference picture or a reference block and provide a reconstructed picture to an output unit.

As described above, hereinafter, in an embodiment of the present disclosure, a coding unit is used as a term of a coding unit for convenience of a description, but it may be a unit which performs decoding as well as encoding.

In addition, as a current block represents a block to be encoded/decoded, it may represent a coding tree block (or a coding tree unit), a coding block (or a coding unit), a transform block (or a transform unit) or a prediction block (or a prediction unit), etc. according to an encoding/decoding step. In this specification, 'unit' may represent a base unit for performing a specific encoding/decoding process and 'block' may represent a pixel array in a predetermined size. Unless otherwise classified, 'block' and 'unit' may be used interchangeably. For example, in the after-described embodiment, it may be understood that a coding block (a coding block) and a coding unit (a coding unit) are used interchangeably.

Figure 3:
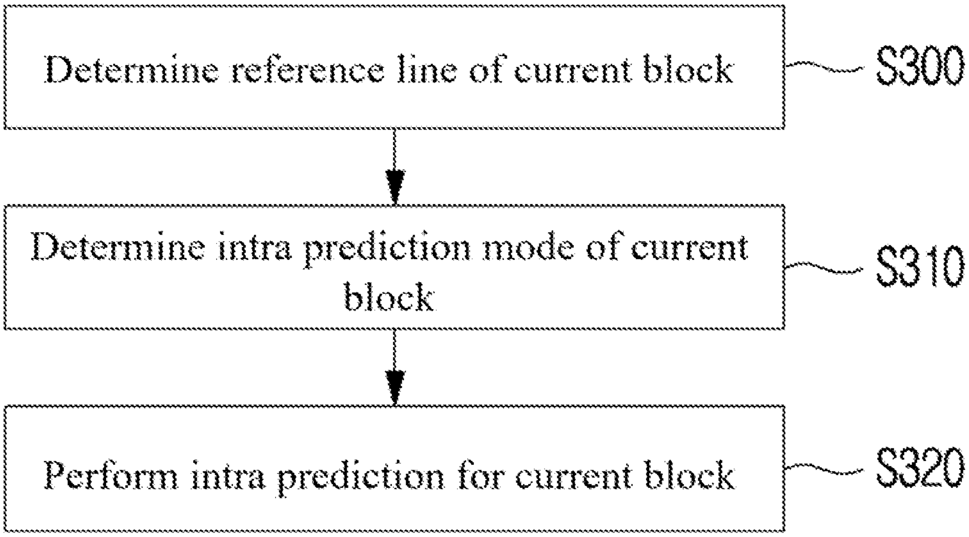
FIG. 3 shows an image encoding/decoding method performed by an image encoding/decoding device according to the present disclosure.

FIG. 3 shows an image encoding/decoding method performed by an image encoding/decoding device according to the present disclosure.

Referring to FIG. 3, a reference line for intra prediction of a current block may be determined S300.

A current block may use one or more of a plurality of reference line candidates pre-defined in an image encoding/decoding device as a reference line for intra prediction. Here, a plurality of pre-defined reference line candidates may include a neighboring reference line adjacent to a current block to be decoded and N non-neighboring reference lines 1-sample to N-samples away from a boundary of a current block. N may be an integer of 1, 2, 3 or more. Hereinafter, for convenience of a description, it is assumed that a plurality of reference line candidates available for a current block consist of a neighboring reference line candidate and three non-neighboring reference line candidates, but it is not limited thereto. In other words, of course, a plurality of reference line candidates available for a current block may include four or more non-neighboring reference line candidates.

An image encoding device may determine an optimal reference line candidate among a plurality of reference line candidates and encode an index for specifying it. An image decoding device may determine a reference line of a current block based on an index signaled through a bitstream. The index may specify any one of a plurality of reference line candidates. A reference line candidate specified by the index may be used as a reference line of a current block.

The number of indexes signaled to determine a reference line of a current block may be 1, 2 or more. As an example, when the number of indexes signaled above is 1, a current block may perform intra prediction by using only a single reference line candidate specified by the signaled index among a plurality of reference line candidates. Alternatively, when the number of indexes signaled above is at least two, a current block may perform intra prediction by using a plurality of reference line candidates specified by a plurality of indexes among a plurality of reference line candidates.

Referring to FIG. 3, an intra prediction mode of a current block may be determined S310.

An intra prediction mode of a current block may be determined among a plurality of intra prediction modes pre-defined in an image encoding/decoding device. The plurality of pre-defined intra prediction modes are described by referring to FIGS. 4 and 5.

Figure 4:
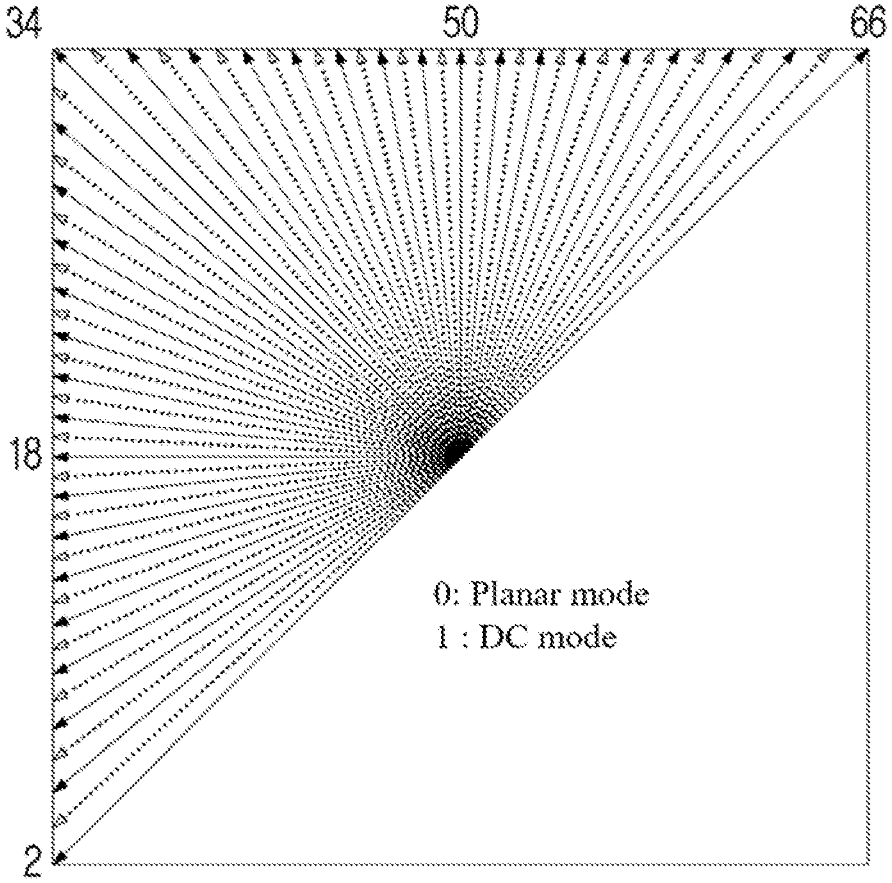
FIGS. 4 and 5 show an example of a plurality of intra prediction modes according to the present disclosure.

FIG. 4 shows an example of a plurality of intra prediction modes according to the present disclosure.

Referring to FIG. 4, a plurality of intra prediction modes pre-defined in an image encoding/decoding device may be composed of a non-directional mode and a directional mode. A non-directional mode may include at least one of a planar mode or a DC mode. A directional mode may include directional mode 2 to 66.

Figure 5:
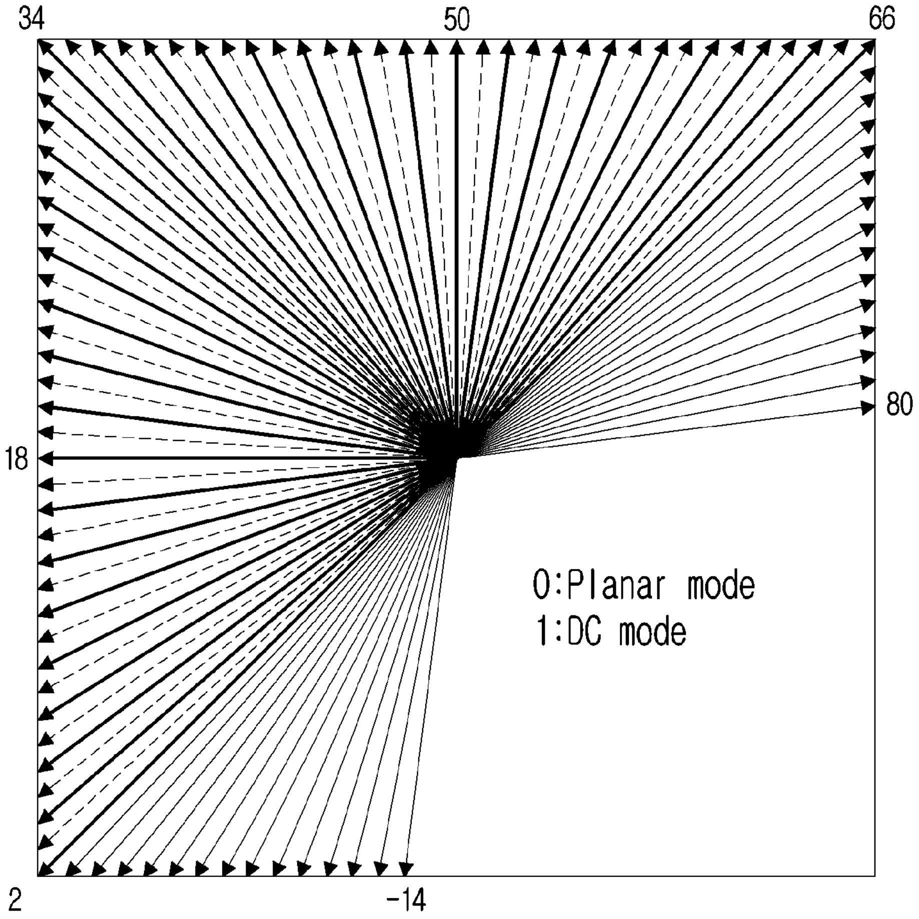

A directional mode may be expanded more than shown in FIG. 4. FIG. 5 shows an example in which a directional mode is expanded.

In FIG. 5, it was illustrated that mode −1 to mode −14 and mode 67 to mode 80 are added. These directional modes may be referred to as a wide-angle intra prediction mode. Whether to use a wide-angle intra prediction mode may be determined according to a shape of a current block. As an example, if a current block is a non-square block whose width is greater than a height, some directional modes (e.g., No. 2 to No. 15) may be transformed to a wide-angle intra prediction mode between No. 67 and No. 80. On the other hand, if a current block is a non-square block whose height is greater than a width, some directional modes (e.g., No. 53 to No. 66) may be transformed to a wide-angle intra prediction mode between No. −1 and No. −14.

A scope of available wide-angle intra prediction modes may be adaptively determined according to a width-to-height ratio of a current block. Table 1 shows a scope of available wide-angle intra prediction modes according to a width-to-height ratio of a current block.

TABLE 1

| Width/Height | Available wide-angle intra prediction mode range |
|---|---|
| W/H = 16 | 67~80 |
| W/H = 8 | 67~78 |
| W/H = 4 | 67~76 |
| W/H = 2 | 67~74 |
| W/H = 1 | None |
| W/H = ½ | −1~−8 |
| W/H = ¼ | −1~−10 |
| W/H = ⅛ | −1~−12 |
| W/H = 1/16 | −1~−14 |

Among the plurality of intra prediction modes, K candidate modes (most probable mode, MPM) may be selected. A candidate list including a selected candidate mode may be generated. An index indicating any one of candidate modes belonging to a candidate list may be signaled. An intra prediction mode of a current block may be determined based on a candidate mode indicated by the index. As an example, a candidate mode indicated by the index may be configured as an intra prediction mode of a current block. Alternatively, an intra prediction mode of a current block may be determined based on a value of a candidate mode indicated by the index and a predetermined difference value. The difference value may be defined as a difference between a value of an intra prediction mode of the current block and a value of a candidate mode indicated by the index. The difference value may be signaled through a bitstream. Alternatively, the difference value may be a value pre-defined in an image encoding/decoding device. Alternatively, an intra prediction mode of a current block may be determined based on a flag showing whether a mode identical to an intra prediction mode of a current block exists in the candidate list. As an example, when the flag is a first value, an intra prediction mode of a current block may be determined from the candidate list. In this case, an index indicating any one of a plurality of candidate modes belonging to a candidate list may be signaled. A candidate mode indicated by the index may be configured as an intra prediction mode of a current block. On the other hand, when the flag is a second value, any one of the remaining intra prediction modes may be configured as an intra prediction mode of a current block. The remaining intra prediction modes may refer to a mode excluding a candidate mode belonging to the candidate list among a plurality of pre-defined intra prediction modes. When the flag is a second value, an index indicating any one of the remaining intra prediction modes may be signaled. An intra prediction mode indicated by the signaled index may be configured as an intra prediction mode of a current block. An intra prediction mode of a chroma block may be selected among intra prediction mode candidates of a plurality of chroma blocks. To this end, index information indicating one of intra prediction mode candidates of a chroma block may be explicitly encoded and signaled through a bitstream. Table 2 illustrates intra prediction mode candidates of a chroma block.

TABLE 2

| Index | Intra Prediction Mode Candidate of Chroma Block |
|---|---|
| 0 | 0 (Planar) |
| 1 | 50 (Vertical) |
| 2 | 18 (Horizontal) |
| 3 | 1 (DC) |
| 4 | DM |

In an example of Table 2, a direct mode (DM) refers to setting an intra prediction mode of a luma block existing at the same position as a chroma block as an intra prediction mode of a chroma block. As a result, an intra prediction mode of a chroma block may be also set as one of intra prediction modes shown in FIG. 4 or FIG. 5. An intra prediction mode of a current block may be used to determine a reference line of a current block, and in this case, S310 may be performed before S300. Referring to FIG. 3, intra prediction may be performed for a current block based on a reference line and an intra prediction mode of a current block S320.

Hereinafter, an intra prediction method per intra prediction mode is described in detail by referring to FIGS. 6 to 8. However, for convenience of a description, it is assumed that a single reference line is used for intra prediction of a current block, but even when a plurality of reference lines are used, an intra prediction method described later may be applied in the same/similar manner.

Figure 6:
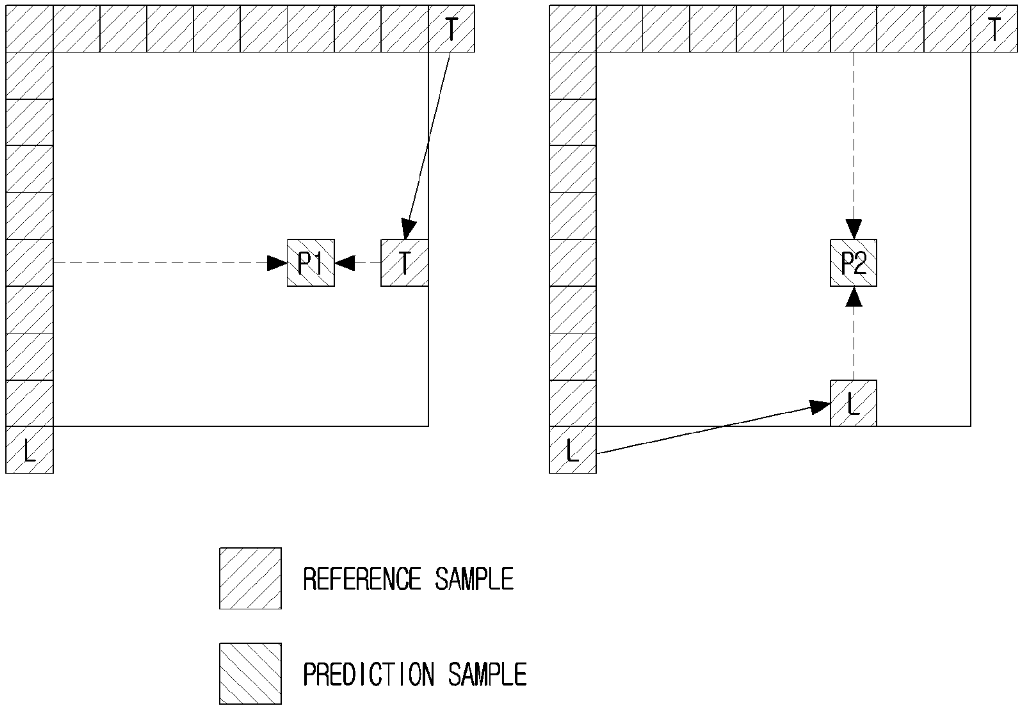
FIG. 6 shows an intra prediction method based on a planar mode according to the present disclosure.

FIG. 6 shows an intra prediction method based on a planar mode according to the present disclosure.

Referring to FIG. 6, T represents a reference sample position at a top-right corner of a current block and L represents a reference sample positioned at a bottom-left corner of a current block. P1 may be generated through interpolation in a horizontal direction. As an example, P1 may be generated by interpolating T with a reference sample positioned on the same horizontal line as P1. P2 may be generated through interpolation in a vertical direction. As an example, P2 may be generated by interpolating L with a reference sample positioned on the same vertical line as P2. A current sample in a current block may be predicted through a weighted sum of P1 and P2 as in Equation 3 below.

$$(\alpha \times P1 + \beta \times P2)/(\alpha + \beta) \quad \text{[Equation 1]}$$

In Equation 1, weight a and B may be determined by considering a width and a height of a current block. According to a width and a height of a current block, weight a and B may have the same value or a different value. If a width and a height of a current block are the same, weight a and B may be configured to be the same and a prediction sample of a current sample may be configured as an average value of P1 and P2. When a width and a height of a current block are not the same, weight a and B may have a different value. As an example, when a width is greater than a height, a smaller value may be configured to a weight corresponding to a width of a current block and a larger value may be configured to a weight corresponding to a height of a current block. Conversely, when a width is greater than a height, a larger value may be configured to a weight corresponding to a width of a current block and a smaller value may be configured to a weight corresponding to a height of a current block. Here, a weight corresponding to a width of a current block may refer to β and a weight corresponding to a height of a current block may refer to α.

Figure 7:
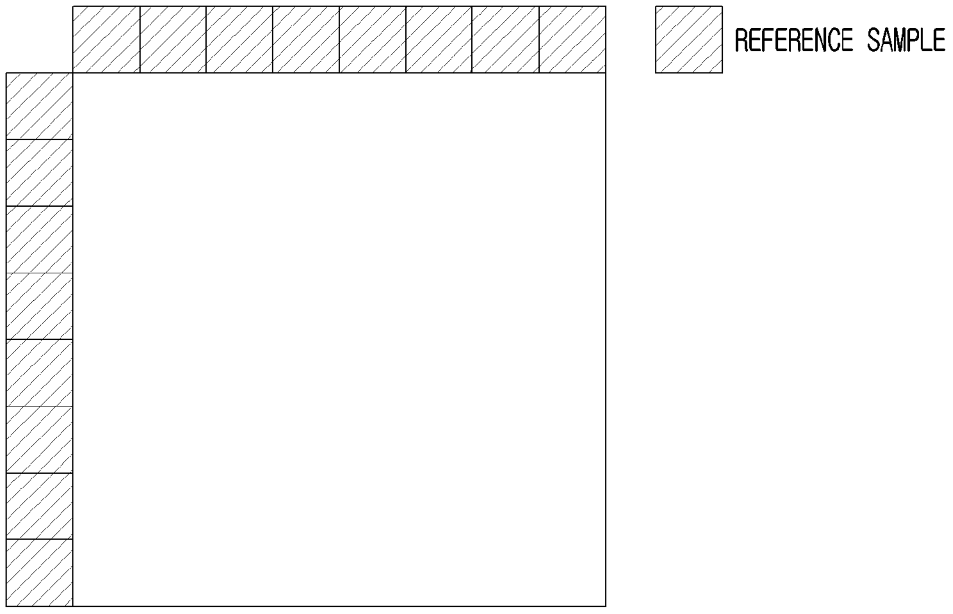
FIG. 7 shows an intra prediction method based on a DC mode according to the present disclosure.

FIG. 7 shows an intra prediction method based on a DC mode according to the present disclosure.

Referring to FIG. 7, an average value of a surrounding sample adjacent to a current block may be calculated, and a calculated average value may be configured as a prediction value of all samples in a current block. Here, a surrounding samples may include a top reference sample and a left reference sample of a current block. However, according to a shape of a current block, an average value may be calculated by using only a top reference sample or a left reference sample. As an example, when a width of a current block is greater than a height, an average value may be calculated by using only a top reference sample of a current block. Alternatively, when a ratio of a width and a height of a current block is greater than or equal to a predetermined threshold value, an average value may be calculated by using only a top reference sample of a current block. Alternatively, when a ratio of a width and a height of a current block is smaller than or equal to a predetermined threshold value, an average value may be calculated by using only a top reference sample of a current block. On the other hand, when a width of a current block is smaller than a height, an average value may be calculated by using only a left reference sample of a current block. Alternatively, when a ratio of a width and a height of a current block is smaller than or equal to a predetermined threshold value, an average value may be calculated by using only a left reference sample of a current block. Alternatively, when a ratio of a width and a height of a current block is greater than or equal to a predetermined threshold value, an average value may be calculated by using only a left reference sample of a current block.

Figure 8:
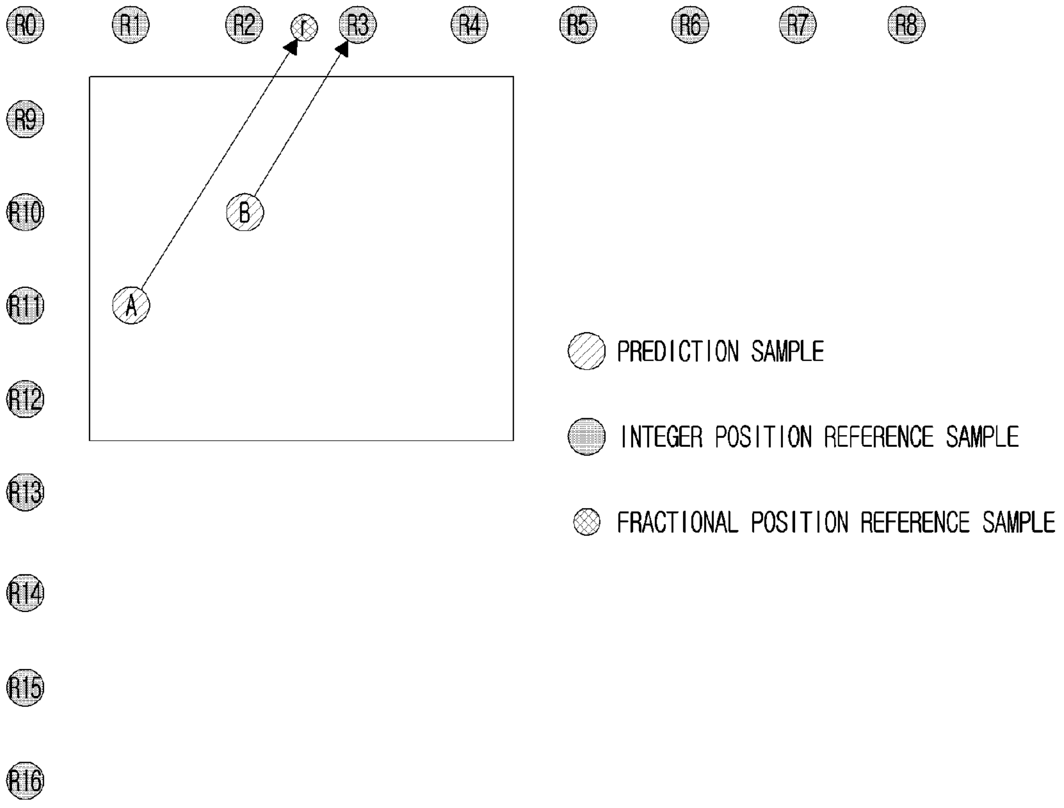
FIG. 8 shows an intra prediction method based on a directional mode according to the present disclosure.

FIG. 8 shows an intra prediction method based on a directional mode according to the present disclosure.

When an intra prediction mode of a current block is a directional mode, projection may be performed to a reference line according to an angle of a corresponding directional mode. When a reference sample exists at a projected position, a corresponding reference sample may be configured as a prediction sample of a current sample. If a reference sample does not exist at a projected position, a sample corresponding to a projected position may be generated by using one or more surrounding samples neighboring a projected position. As an example, interpolation may be performed based on two or more surrounding samples neighboring bidirectionally based on a projected position to generate a sample corresponding to a projected position.

Alternatively, one surrounding sample neighboring a projected position may be configured as a sample corresponding to a projected position. In this case, among a plurality of surrounding samples neighboring a projected position, a surrounding sample closest to a projected position may be used. A sample corresponding to a projected position may be configured as a prediction sample of a current sample.

Referring to FIG. 8, for current sample B, when projection is performed to a reference line according to an angle of an intra prediction mode at a corresponding position, a reference sample exists at a projected position (i.e., a reference sample at an integer position, R3). In this case, a reference sample at a projected position may be configured as a prediction sample of current sample B. For current sample A, when projection is performed to a reference line according to an angle of an intra prediction mode at a corresponding position, a reference sample (i.e., a reference sample at an integer position) does not exists at a projected position. In this case, interpolation may be performed based on surrounding samples (e.g., R2 and R3) neighboring a projected position to generate a sample (r) at a fractional position. A generated sample (r) at a fractional position may be configured as a prediction sample of current sample A.

Figure 9:
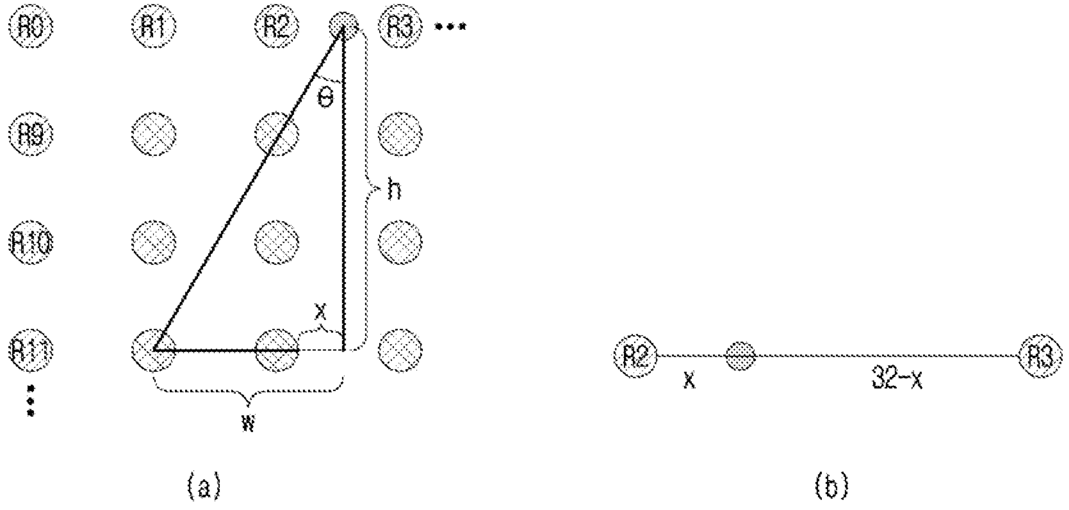
FIG. 9 shows a method for deriving a sample at a fractional position.

FIG. 9 shows a method for deriving a sample at a fractional position.

In an example of FIG. 9, variable h refers to a vertical distance (i.e., a vertical distance) from a position of prediction sample A to a reference sample line, and variable w refers to a horizontal distance (i.e., a horizontal distance) from a position of prediction sample A to a fractional position sample. In addition, variable θ refers to an angle which is predefined according to directivity of an intra prediction mode, and variable x refers to a fractional position.

Variable w may be derived as in Equation 2 below.

$$w = h\tan\theta \qquad \text{[Equation 2]}$$

Then, if an integer position is removed from variable w, finally, a fractional position may be derived.

A fractional position sample may be generated by interpolating adjacent integer position reference samples. As an example, a fractional position reference sample at a x position may be generated by interpolating integer position reference sample R2 and integer position reference sample R3.

In deriving a fractional position sample, a scaling factor may be used to avoid a real number operation. As an example, when scaling factor f is set as 32, as in an example shown in FIG. 8(*b*), a distance between neighboring integer reference samples may be set as 32, not 1.

In addition, a tangent value for angle θ determined according to directivity of an intra prediction mode may be also scaled up by using the same scaling factor (e.g., 32).

FIGS. 10 and 11 show that a tangent value for an angle is scaled 32 times per intra prediction mode.

FIG. 10 shows a scaled result of a tangent value for a non-wide angle intra prediction mode, and FIG. 11 shows a scaled result of a tangent value for a wide angle intra prediction mode.

An intra prediction mode of a current block may be derived by using reference samples around a current block. Specifically, after calculating a gradient in a horizontal and vertical direction for reference samples, an intra prediction mode of a current block may be derived by using a calculated gradient.

Figure 12:
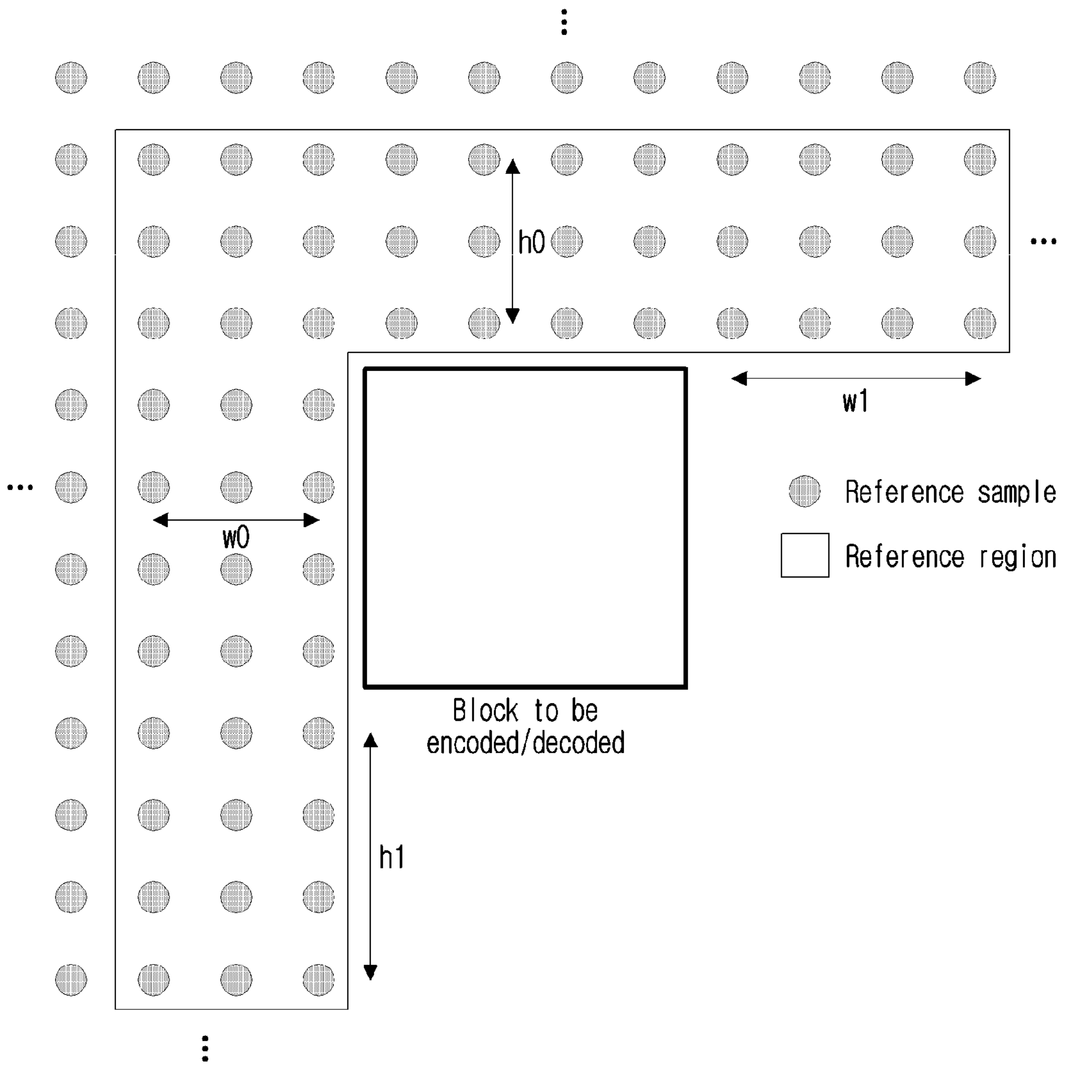
FIGS. 12 and 13 are a diagram for describing an example of setting a reference region.

FIG. 12 is a diagram for describing an example of setting a reference region.

For convenience of a description, it is assumed that a size of a current block is 4×4.

A reference region for deriving an intra prediction mode of a current block may be set. As an example, in FIG. 12, it was assumed that w0 columns adjacent to the left of a current block and h0 rows adjacent to the top of a current block are set as a reference region.

The number of columns (w0) and/or the number of rows (h0) constituting a reference region may be fixed in an encoder and a decoder. Alternatively, based on at least one of a size/a shape of a current block, whether Intra Sub-Partitioning (ISP) is applied to a current block or whether a current block is adjacent to a CTU boundary, the number of columns (w0) and/or the number of rows (h0) may be determined.

As another example, a size of a reference region may be determined according to a filter shape applied to a reference region. Specifically, a horizontal length and a vertical length of a filter may be set as the number of columns w0 and the number of rows h0, respectively. As an example, when it is assumed that a 3×3 mask shown in FIG. 14, which will be described later, is used, the number of columns w0 and the number of rows h0 may be set as 3, respectively.

A reference region may be extended beyond a right boundary and/or a bottom boundary of a current block. As an example, in an example shown in FIG. 12, it was illustrated that a reference region is extended by w1 from a right boundary of a current block and is extended by h1 from a bottom boundary of a current block.

Right extension distance w1 and/or bottom extension distance h1 may be set to be the same as a width and/or a height of a current block. As an example, if a size of a current block is 4×4, right extension distance w1 may be set as 4 to be the same as a width of a current block, and bottom extension distance h1 may be set as 4 to be the same as a height of a current block.

Figures 13, 14:
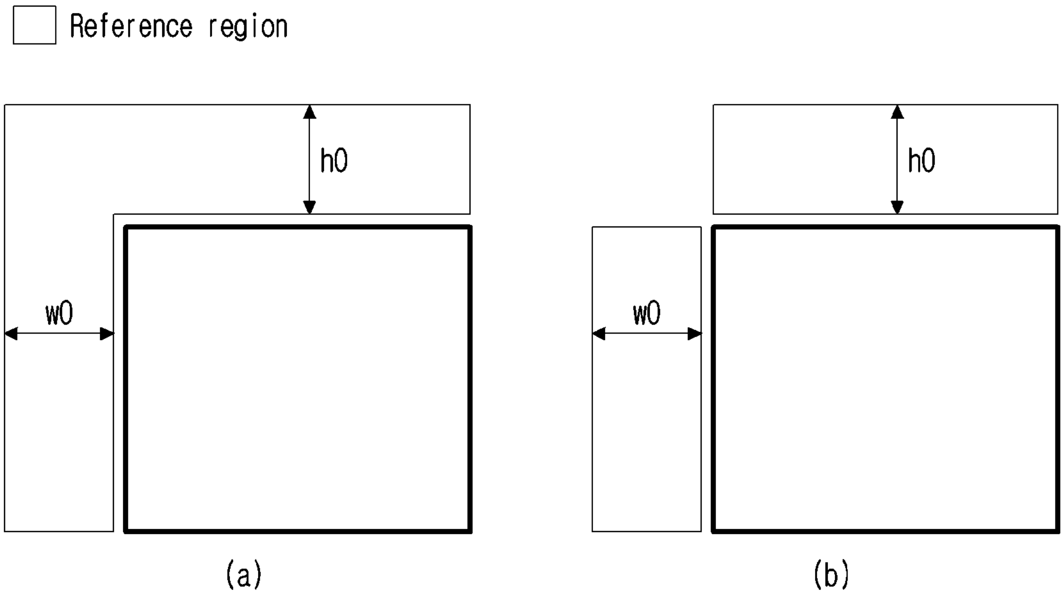
FIG. 14 illustrates filter coefficients for each of a Sobel mask and a Prewitt mask.

As another example, as in an example shown in FIG. 13, a reference region may be set.

Specifically, as in an example shown in FIG. 13(*a*), right extension distance w1 and/or bottom extension distance h1 may be set as 0. Furthermore, as in an example shown in FIG. 13(*b*), a top reference region may be composed of only reference samples whose x-axis coordinate is between 0 and (w−1), and a left reference region may be composed of only reference samples whose y-axis coordinate is between 0 and (h−1). Here, w represents a width of a current block, and h represents a height of a current block.

As another example, reference line candidates for intra prediction of a current block or at least one of reference line candidates may be set as a reference region.

As another example, according to whether a current block is adjacent to a CTU boundary, a reference region may be composed of only top reference regions or may be composed of only left reference regions.

Filtering (i.e., convolution) using a mask within a reference region may be performed. In this case, a filter used may be at least one of a Sobel mask or a Prewitt mask that a gradient value is output.

FIG. 14 illustrates filter coefficients for each of a Sobel mask and a Prewitt mask.

A different type of filter from that shown in FIG. 14 may be applied to a reference region. As an example, instead of a 3×3-sized square filter, a 1×3 or 3×1-sized 1D filter, a 2×3 or 2×3-sized rectangular filter, a cross-shaped filter or a diamond-shaped filter may be applied to a reference region. Alternatively, a filter in a size different from that shown in FIG. 14 (e.g., 2×2, 4×4, or 5×5, etc.) may be applied to a reference region.

A type of a filter applied to a reference region may be predefined in an encoder and a decoder. Alternatively, after predefining a plurality of filter candidates, index information indicating one of a plurality of filter candidates may be encoded and explicitly signaled through a bitstream.

As another example, based on at least one of a size/a shape of a current block, whether ISP is applied to a current block, a size of a reference region, an intra prediction mode of a neighboring block or whether a current block borders a CTU boundary, at least one of a plurality of filter candidates may be adaptively selected. Here, a neighboring block may include at least one of a top neighboring block or a left neighboring block of a current block.

A type of a filter applied to a top reference region may be different from a type of a filter applied to a left reference region.

By applying a vertical mask to a specific reference sample in a reference region, Dy, a vertical gradient for a reference sample, may be obtained. In addition, by applying a horizontal mask to a specific reference sample in a reference region, Dx, a horizontal gradient for a reference sample, may be obtained.

Figure 15:
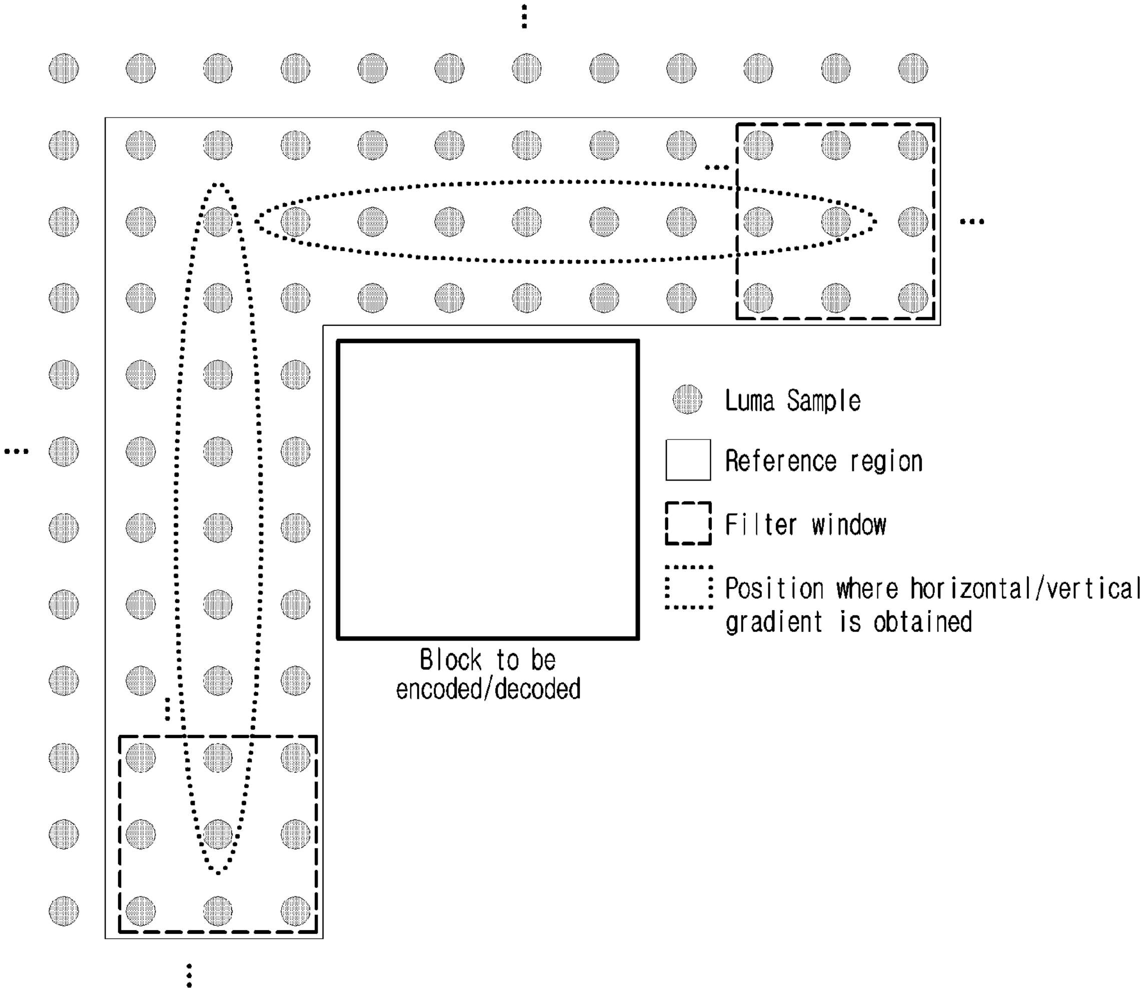
FIG. 15 shows a position where a vertical gradient and a horizontal gradient within a reference region are obtained.

FIG. 15 shows a position where a vertical gradient and a horizontal gradient within a reference region are obtained.

As in an example shown in FIG. 14, when it is assumed that a 3×3-sized mask is applied, a vertical gradient Dy and a horizontal gradient Dx may be obtained for each of reference samples that are not adjacent to a boundary of a reference region. As an example, when w0 and h0 are 3 and w1 and h1 are 4, as in an example shown in FIG. 14, for each of 17 reference samples, 17 vertical gradients Dy and 17 horizontal gradients Dx may be obtained.

When a filter of a different size or a different shape from that shown in FIG. 14 is applied, a vertical gradient Dy and a horizontal gradient Dx may be obtained for more/fewer reference samples than shown.

Based on a vertical gradient Dy and a horizontal gradient Dx of each of reference samples, an intra prediction mode for each of reference samples may be determined.

A method for determining an intra prediction mode of a reference sample by using a vertical gradient Dy and a horizontal gradient Dx will be described.

As an example, when any one of a vertical gradient Dy and a horizontal gradient Dx is 0, a directional mode of a corresponding reference sample may be determined as a horizontal mode (No. 18) or a vertical mode (No. 50). Specifically, when a horizontal gradient Dx is 0 and a vertical gradient Dy is not 0, an intra prediction mode of a corresponding reference sample may be determined as a vertical mode (No. 50). Conversely, when a vertical gradient Dy is 0 and a horizontal gradient Dx is not 0, an intra prediction mode of a corresponding reference sample may be determined as a horizontal mode (No. 18).

When both a vertical gradient Dy and a horizontal gradient Dx are not 0, one of the remaining directional modes excluding a horizontal mode and a vertical mode may be determined as an intra prediction mode of a reference sample.

Here, an intra prediction mode group to which an intra prediction mode of a reference sample belongs may be determined by comparing an absolute value of a vertical gradient Dy and a horizontal gradient Dx. Here, an intra prediction mode group may be composed of a plurality of directional modes with similar directivity.

Figure 16:
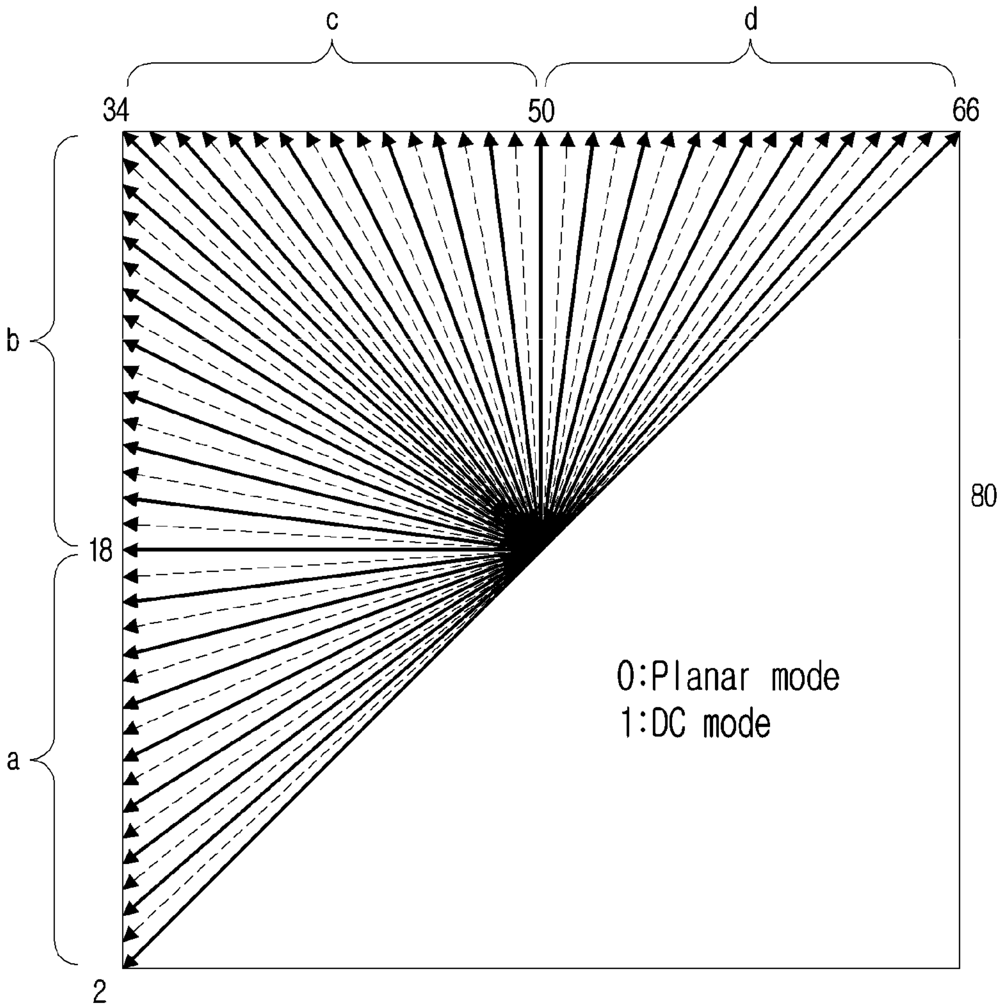
FIG. 16 shows an example in which directional modes are grouped into a plurality of intra prediction mode groups.

FIG. 16 shows an example in which directional modes are grouped into a plurality of intra prediction mode groups.

In FIG. 16, it was illustrated that directional modes are classified into four intra prediction mode groups (a to d) based on a horizontal mode (No. 18), a diagonal mode (No. 34) and a vertical mode (No. 50).

In a shown example, group a and group b have a symmetrical structure based on a horizontal mode (No. 18), and group c and group d have a symmetrical structure based on a vertical mode (No. 50).

In addition, an angle of directional mode No. 36 to 66 is the same as that obtained by transposing an angle of mode No. 2 to 34.

If an absolute value of a horizontal gradient Dx of a reference sample is greater than an absolute value of a vertical gradient Dy, a directional mode of a corresponding reference sample may belong to group a or group b.

Conversely, if an absolute value of a vertical gradient Dy of a reference sample is greater than a gradient of a horizontal gradient Dx, a directional mode of a corresponding reference sample may belong to group c or group d.

Table 3 shows an intra prediction mode group to which an intra prediction mode of a reference sample belongs according to a size of a horizontal gradient Dx and a vertical gradient Dy.

TABLE 3

| if (\|Dx\| > \|Dy\|) | | | Else | | |
|---|---|---|---|---|---|
| Dx >= 0 | Dy >= 0 | b | Dx >= 0 | Dy >= 0 | c |
| Dx < 0 | Dy >= 0 | a | Dx < 0 | Dy >= 0 | d |
| Dx >= 0 | Dy < 0 | a | Dx >= 0 | Dy < 0 | d |
| Dx < 0 | Dy < 0 | b | Dx < 0 | Dy < 0 | c |

A horizontal gradient Dx and a vertical gradient Dy of a reference sample may be used to derive a gradient of a directional mode which will be allocated to a reference sample. To this end, as in Equation 3 below, variable R representing a ratio between a horizontal gradient and a vertical gradient may be derived.

$$R = (|Dx| >= |Dy|)?(|Dy|/|Dx|):(|Dx|/|Dy|) \quad \text{[Equation 3]}$$

As illustrated in Equation 3, variable R may be derived by using one having a larger absolute value of a horizontal gradient Dx and a vertical gradient Dy as a denominator.

Afterwards, a directional mode of a reference sample may be determined by comparing variable R and a tangent value (tan θ) for an angle of each directional mode. Specifically, a directional mode having a tangent value which is the same as or most similar to variable R may be allocated to a reference sample.

In this case, as in an example shown in FIG. 10 or FIG. 11, if a tangent value for an angle of each directional mode is stored in an encoder and a decoder in a scaled state, a directional mode of a reference sample may be determined by using the same scaling factor to scale variable R.

Next, an amplitude of each reference sample may be derived. As in Equation 4 below, an amplitude may be derived as the sum of an absolute value of a horizontal gradient Dx and an absolute value of a vertical gradient Dy.

$$\text{amplitude} = |Dx| + |Dy| \quad \text{[Equation 4]}$$

Next, for each intra prediction mode, an amplitude value of each reference sample to which the same intra prediction mode is allocated may be accumulated.

$$\text{histogram[intra\_mode]} += \text{amplitude} \quad \text{[Equation 5]}$$

In Equation 5, intra_mode represents an intra prediction mode. As an example, an accumulated amplitude value for a directional mode whose mode number is N may be derived by combining an amplitude value of reference samples to which mode No. N is allocated in a reference region, and an accumulated amplitude value for a directional mode whose mode number is M may be derived by combining an amplitude value of reference samples to which mode No. M is allocated in a reference region.

A buffer storing an accumulated amplitude value may be initialized in a unit of a block. As an example, when designating a reference region around a current block, an accumulated amplitude value for each intra prediction mode may be initialized to 0.

If a histogram recording an accumulated amplitude value for each intra prediction mode is derived through the process, at least one intra prediction mode may be selected in descending order of accumulated amplitude values in a histogram. The number of selected intra prediction modes may be M, and M may be a natural number equal to or greater than 1. A value of M may be predefined in an encoder and a decoder. Alternatively, a value of M may be adaptively determined by considering at least one of a size/a shape of a current block or whether ISP is applied to a current block. In other words, M intra prediction modes may be selected in descending order of accumulated amplitude values.

At least one intra prediction mode selected from a histogram may be set as an intra prediction mode of a current block, and a prediction block of a current block may be obtained based on an intra prediction mode of a current block. As an example, when one intra prediction mode is selected from a histogram, a prediction block obtained based on a selected intra prediction mode may be used as a final prediction block of a current block.

When a plurality of intra prediction modes are selected from a histogram, intra prediction may be performed based on each of a plurality of intra prediction modes. Accordingly, when a plurality of prediction blocks are generated, a final prediction block of a current block may be obtained through an average operation or a weighted sum operation of a plurality of prediction blocks.

In this case, for a weighted sum operation, a weight applied to each prediction block may be determined based on an amplitude of an intra prediction mode. In other words, the largest weight may be allocated to a prediction block derived based on an intra prediction mode with the largest amplitude among a plurality of intra prediction modes, and the smallest weight may be allocated to a prediction block derived based on an intra prediction mode with the smallest amplitude.

In this case, a weight allocated to each prediction block may be determined based on a ratio between amplitudes. Alternatively, after storing a weight value per amplitude rank in advance, a weight mapped to an amplitude rank of a corresponding intra prediction mode may be applied to a prediction block.

A prediction block of a current block may be obtained by further considering at least one default mode, along with at least one intra prediction mode selected from a histogram. As an example, intra prediction may be performed based on each of an intra prediction mode and a default mode selected from a histogram to obtain a plurality of prediction blocks for a current block. Afterwards, a final prediction block of a current block may be obtained through an average operation or a weighted sum operation of a plurality of prediction blocks.

N, the number of default modes, may be 0 or an integer equal to or greater than 1. When M intra prediction modes are selected from a histogram, (M+N) prediction blocks may be obtained by performing intra prediction based on each of M intra prediction modes and N default modes. Afterwards, a final prediction block of a current block may be obtained through an average operation or a weighted sum operation of (M+N) prediction blocks.

N, the number of default modes, may be predefined in an encoder and a decoder. Alternatively, based on at least one of a size/a shape of a current block, whether ISP is applied to a current block or whether at least one intra prediction mode selected from a histogram includes a default mode, N, the number of default modes, may be adaptively determined.

A default mode may include at least one of a planar mode, a DC mode or a predefined directional mode.

An encoder and a decoder may be set to use a predefined mode (e.g., a planar mode) among the above-listed modes as a default mode.

Alternatively, a type of a default mode may be adaptively determined according to a type of a directional mode selected through a histogram. As an example, when at least one directional mode selected through a histogram is a vertical mode or a horizontal mode, a planar mode or a DC mode may be set as a default mode. On the other hand, when a vertical mode and/or a horizontal mode is not selected through a histogram, a vertical mode or a horizontal mode may be set as a default mode.

According to a shape of a current block, whether a wide angle intra prediction mode is available may be determined. As an example, if a current block has a square shape whose width and height are the same, directional modes selected from a histogram may be composed of non-wide angle intra prediction modes. On the other hand, if a current block has a non-square shape whose width and height are different, some of directional modes selected from a histogram may be transformed to a wide angle intra prediction mode.

When intra prediction is performed based on an intra prediction mode derived through a histogram, a predefined reference line may be used. Here, a predefined reference line may be an adjacent reference line adjacent to a current block (e.g., index 0) or a non-adjacent reference line (e.g., index 1).

The above-described information indicating whether to apply a method for performing intra prediction by selecting an intra prediction mode through a histogram may be encoded and signaled through a bitstream. The information may be a 1-bit flag.

Alternatively, based on at least one of a size/a shape of a current block, whether ISP is applied to a current block, whether a current block borders a CTU boundary or whether a neighboring block is encoded by intra prediction, whether to select an intra prediction mode through a histogram may be determined.

As an example, when at least one of a top neighboring block or a left neighboring block of a current block is not encoded by intra prediction, a method for selecting an intra prediction mode through a histogram may be applied to a current block.

A method for selecting an intra prediction mode through a histogram may be applied to both a luma component and a chroma component. Alternatively, the above-described method may be applied only to a luma component. Alternatively, whether to select an intra prediction mode through a histogram may be determined independently for each of a luma component and a chroma component.

When encoding/decoding a chroma block, an intra prediction mode of a chroma block may be determined based on a characteristic of a luma block. Here, a characteristic of a luma block may represent a gradient of samples belonging to a luma block (specifically, a horizontal gradient Dx and a vertical gradient Dy). In addition, a sample used to derive the gradient may refer to a reconstructed sample within a luma block.

Figure 17:
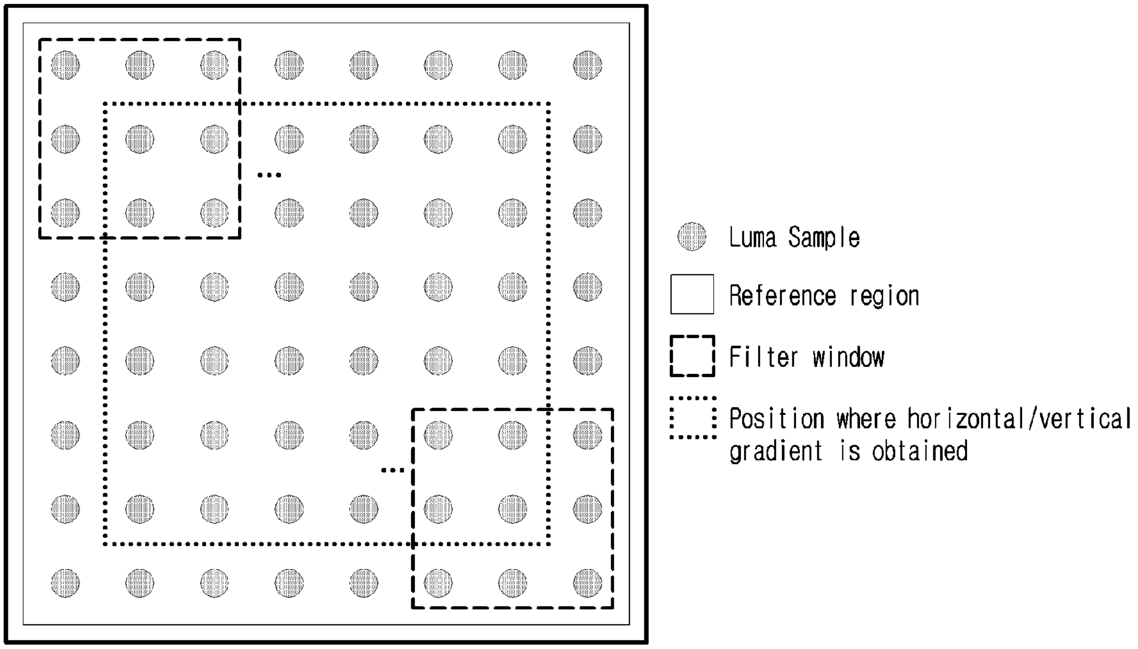
FIG. 17 is a diagram for describing a method for determining an intra prediction mode of a chroma block based on a characteristic of a luma block.

FIG. 17 is a diagram for describing a method for determining an intra prediction mode of a chroma block based on a characteristic of a luma block.

The entire luma block or a partial region of a luma block may be set as a reference region. Then, through filtering, a gradient for a sample in a reference region may be obtained. As an example, when a 3×3-sized mask shown in FIG. 14 is applied, as in an example shown in FIG. 17, for each of the remaining samples excluding samples adjacent to a boundary of a luma block, a horizontal gradient Dx and a vertical gradient Dy may be obtained.

As another example, at least a partial region of a luma block and a pre-reconstructed region around a luma block may be set as a reference region. As an example, at least one of at least one reconstructed sample line adjacent to the top of a luma block or at least one reconstructed sample line adjacent to the left of a luma block may be further included in a reference region.

After determining an intra prediction mode of each sample by using a horizontal gradient and a vertical gradient of each sample, a histogram may be derived based on an accumulated amplitude value per intra prediction mode. Since a method for deriving a histogram has been described in detail through Equation 3 to 5, a detailed description thereof will be omitted.

An intra prediction mode with the largest accumulated amplitude value in a histogram may be set as an intra prediction mode of a chroma block at the same position as a luma block. In other words, by performing intra prediction based on an intra prediction mode with the largest accumulated amplitude value in a histogram, a prediction block of a chroma block may be obtained.

As another example, after selecting N intra prediction modes with a large accumulated amplitude value from a histogram, intra prediction may be performed based on each of N intra prediction modes to obtain N prediction blocks for a chroma block. Here, N may be a natural number equal to or greater than 1. N may be determined based on at least one of a size/a shape of a current block, a color format or the number of intra prediction modes selected from a histogram in intra prediction of a luma block. Afterwards, a final prediction block of a chroma block may be obtained through an average operation or a weighted sum operation of N prediction blocks.

In this case, for a weighted sum operation, a weight applied to each prediction block may be determined based on an amplitude of an intra prediction mode. In other words, the largest weight may be allocated to a prediction block derived based on an intra prediction mode with the largest amplitude among a plurality of intra prediction modes, and the smallest weight may be allocated to a prediction block derived based on an intra prediction mode with the smallest amplitude.

In this case, a weight allocated to each prediction block may be determined based on a ratio between amplitudes. Alternatively, after storing a weight value per amplitude rank in advance, a weight mapped to an amplitude rank of a corresponding intra prediction mode may be applied to a prediction block.

As another example, at least one intra prediction mode with a large amplitude that does not overlap with an intra prediction mode of a pre-derived chroma block may be selected from a histogram. Here, an intra prediction mode of a pre-derived chroma block may be one of intra prediction mode candidates determined through index information (refer to Table 2).

In this case, intra prediction may be performed based on each of an intra prediction mode of a pre-derived chroma block and at least one intra prediction mode selected from a histogram to obtain a plurality of prediction blocks for a chroma block. Afterwards, a final prediction block of a chroma block may be obtained through an average operation or a weighted sum operation of a plurality of prediction blocks.

As another example, intra prediction may be performed based on each of at least one default mode and at least one intra prediction mode derived from a histogram to obtain a plurality of prediction blocks for a chroma block. Here, a default mode may include at least one of a planar mode, a DC mode or a predefined directional mode. Afterwards, a final prediction block of a chroma block may be obtained through an average operation or a weighted sum operation of a plurality of prediction blocks.

An intra prediction mode may be also determined in a unit of a sub-block within a chroma block.

Figure 18:
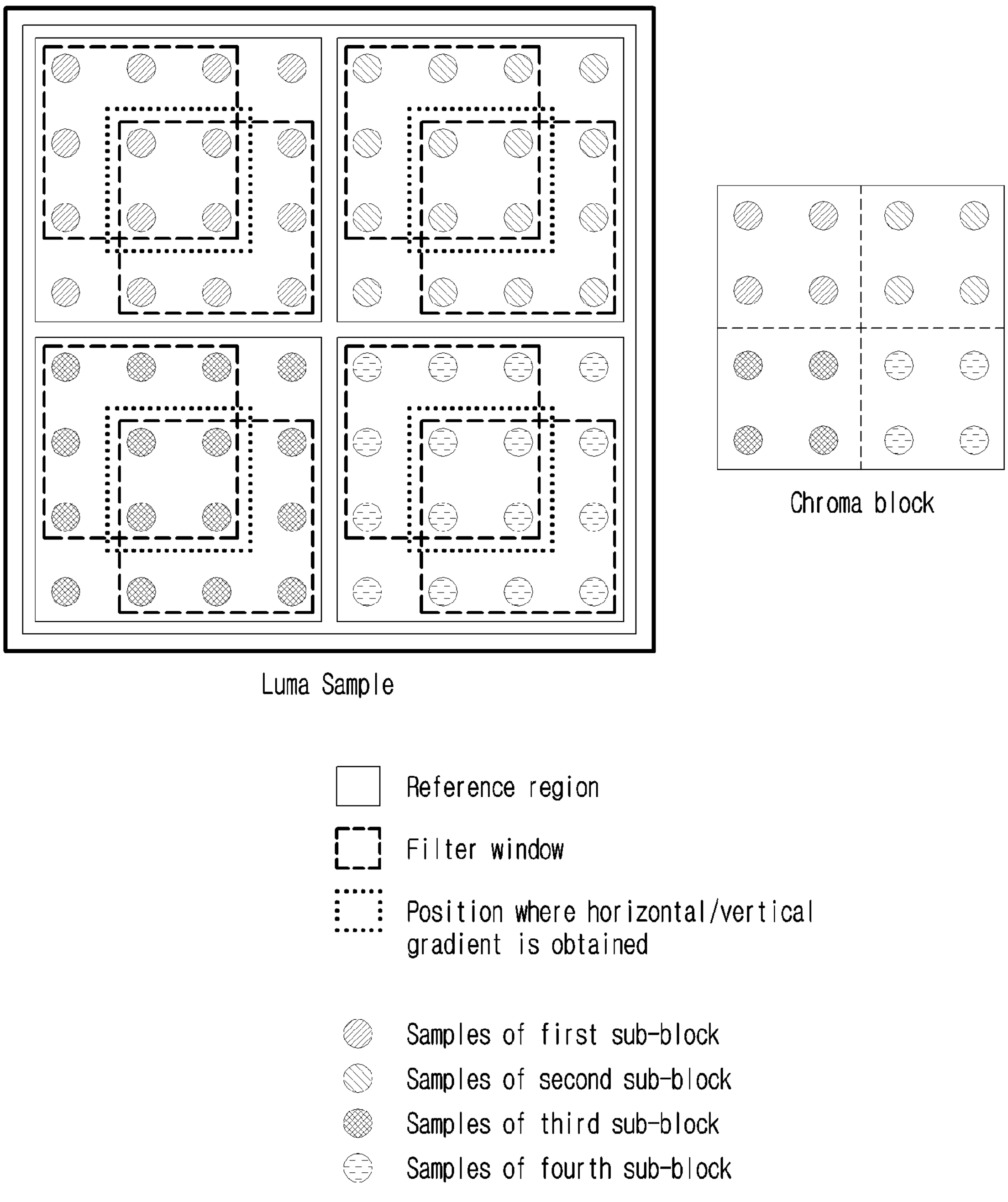
FIG. 18 is a diagram for describing an example in which an intra prediction mode is determined in a unit of a sub-block.

FIG. 18 is a diagram for describing an example in which an intra prediction mode is determined in a unit of a sub-block.

For convenience of a description, it is assumed that a color format is 4:2:0.

As in a shown example, a chroma block may be partitioned into sub-blocks in a predetermined size. In a shown example, it was illustrated that a chroma block is partitioned into 2×2-sized sub-blocks.

In addition, a reference region may be set centered on a sub-block of a luma block corresponding to a sub-block of a chroma block. In an example shown in FIG. 18, it was illustrated that a reference region of each 2×2-sized sub-block in a chroma block is designated as a 4×4-sized region in a luma block corresponding to a 2×2-sized sub-block. Unlike a shown example, a reference region for each sub-block may be designated in a size larger than 4×4.

Afterwards, a histogram may be derived per each sub-block. Based on a histogram of each sub-block, at least one intra prediction mode may be obtained for each sub-block. Afterwards, at least one sub-prediction block may be obtained for each sub-block based on at least one intra prediction mode. When a plurality of sub-prediction blocks are obtained, a final prediction block of each sub-block may be obtained based on an average operation or a weighted sum operation of sub-prediction blocks.

A term of syntaxes used in the above-described embodiments is just named for convenience of a description.

When embodiments described based on a decoding process or an encoding process are applied to an encoding process or a decoding process, it is included in a scope of the present disclosure. When embodiments described in predetermined order are changed in order different from a description, it is also included in a scope of the present disclosure.

The above-described embodiment is described based on a series of steps or flow charts, but it does not limit a time series order of the present disclosure and if necessary, it may be performed at the same time or in different order. In addition, each component (e.g., a unit, a module, etc.) configuring a block diagram in the above-described embodiment may be implemented as a hardware device or software and a plurality of components may be combined and implemented as one hardware device or software. The above-described embodiment may be recorded in a computer readable recoding medium by being implemented in a form of a program instruction which may be performed by a variety of computer components. The computer readable recoding medium may include a program instruction, a data file, a data structure, etc. solely or in combination. A hardware device which is specially configured to store and perform magnetic media such as a hard disk, a floppy disk and a magnetic tape, optical recording media such as CD-ROM, DVD, magneto-optical media such as a floptical disk and a program instruction such as ROM, RAM, a flash memory, etc. is included in a computer readable recoding medium. The hardware device may be configured to operate as one or more software modules in order to perform processing according to the present disclosure and vice versa.

INDUSTRIAL AVAILABILITY

An embodiment described in the present disclosure may be applied to an electronic device which may encode/decode an image.

The invention claimed is:

1. A method of decoding an image, the method comprising:
- constructing a histogram of a current block based on reconstruction samples included in a reference region of the current block;
- deriving a plurality of intra prediction modes using the histogram of the current block; and
- based on the plurality of intra prediction modes, performing an intra prediction on the current block,
- wherein the histogram is constructed by accumulating amplitudes for respective intra prediction modes,
- wherein an amplitude is derived based on a horizontal gradient and a vertical gradient of a reference sample in the reference region, and
- wherein a size of a filter used to obtain the horizontal gradient and the vertical gradient of the reference samples is adaptively determined as one of 3×3 or 2×2 according to a size of the current block.

2. The method of claim 1, wherein an intra prediction mode of the reference sample in the reference region is obtained based on a ratio between an absolute value of the horizontal gradient and an absolute value of the vertical gradient of the reference sample.

3. The method of claim 2, wherein the amplitude of the reference sample is derived as a sum of the absolute value of the horizontal gradient and the absolute value of the vertical gradient of the reference sample.

4. The method of claim 1, wherein a maximum number of intra prediction modes derived from the histogram is adaptively determined according to the size of the current block.

5. The method of claim 1,
- wherein a final prediction block of the current block is obtained based on a weighted sum of the plurality of intermediate prediction blocks obtained by performing intra prediction using the plurality of intra prediction modes.

6. A method of encoding an image, the method comprising:
- constructing a histogram of a current block based on reconstruction samples included in a reference region of the current block;
- deriving a plurality of intra prediction modes using the histogram of the current block; and
- based on the plurality of intra prediction modes, performing an intra prediction on the current block,
- wherein the histogram is constructed by accumulating amplitudes for respective intra prediction modes,
- wherein an amplitude is derived based on a horizontal gradient and a vertical gradient of a reference sample in the reference region, and
- wherein a size of a filter used to obtain the horizontal gradient and the vertical gradient of the reference samples is adaptively determined as one of 3×3 or 2×2 according to a size of the current block.

7. A device for transmitting compressed video data, the device comprising:
- a processor to obtain the compressed video data; and
- a transmitter to transmit the compressed video data,
- wherein to obtain the compressed video data, the processor is configured to:
- construct a histogram of a current block based on reconstruction samples included in a reference region of the current block;
- derive a plurality of intra prediction modes using the histogram of the current block; and
- based on the plurality of intra prediction modes, perform an intra prediction on the current block,
- wherein the histogram is constructed by accumulating amplitudes for respective intra prediction modes,
- wherein an amplitude is derived based on a horizontal gradient and a vertical gradient of a reference sample in the reference region, and
- wherein a size of a filter used to obtain the horizontal gradient and the vertical gradient of the reference samples is adaptively determined as one of 3×3 or 2×2 according to a size of the current block.

* * * * *